(12) United States Patent
Takizawa et al.

(10) Patent No.: US 7,103,901 B2
(45) Date of Patent: Sep. 5, 2006

(54) DISC CARTRIDGE

(75) Inventors: Teruyuki Takizawa, Neyagawa (JP); Yoshito Saji, Ashiya (JP); Hironori Okazawa, Katano (JP); Kuniko Nakata, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 44 days.

(21) Appl. No.: 10/510,780

(22) PCT Filed: Apr. 6, 2004

(86) PCT No.: PCT/JP2004/004970

§ 371 (c)(1), (2), (4) Date: Oct. 12, 2004

(87) PCT Pub. No.: WO2004/090894

PCT Pub. Date: Oct. 21, 2004

(65) Prior Publication Data

US 2005/0120365 A1    Jun. 2, 2005

(30) Foreign Application Priority Data

Apr. 9, 2003 (JP) ............................. 2003-105277
Dec. 26, 2003 (JP) ............................. 2003-433372

(51) Int. Cl.
*G11B 23/03* (2006.01)

(52) U.S. Cl. ............... 720/741; 720/729; 720/742; 360/133; 369/291

(58) Field of Classification Search ............... 720/741
See application file for complete search history.

(56) References Cited

U.S. PATENT DOCUMENTS

| | | | |
|---|---|---|---|
| 4,613,044 A | 9/1986 | Saito et al. | |
| 4,617,655 A | 10/1986 | Aldenhoven | |
| 4,630,728 A * | 12/1986 | Matsumoto et al. | 206/313 |
| 4,692,831 A | 9/1987 | Suzuki | |
| 4,722,439 A | 2/1988 | Grobecker et al. | |
| 4,773,061 A | 9/1988 | Stark et al. | |
| 4,862,448 A | 8/1989 | Tanaka et al. | |
| 4,928,271 A | 5/1990 | Verhagen | |
| 5,153,801 A * | 10/1992 | Ikebe et al. | 360/133 |
| 5,499,233 A | 3/1996 | Childers et al. | |
| 5,991,261 A | 11/1999 | Maeda et al. | |

(Continued)

FOREIGN PATENT DOCUMENTS

EP    0 366 452 A2    5/1990

(Continued)

*Primary Examiner*—William Korzuch
*Assistant Examiner*—Matthew Greco Kayrish
(74) *Attorney, Agent, or Firm*—Akin Gump Strauss Hauer & Feld, LLP

(57) ABSTRACT

A disc cartridge includes a cartridge body, first and second shutters, and a rotational member. The cartridge body includes a disc storage portion to store a disc in a rotatable state, a chucking hole provided on the bottom of the disc storage portion so as to get the disc chucked externally, and a head access window provided on the bottom of the disc storage portion so as to allow a head, which reads and/or writes data from/on the disc, to access the disc. The first and second shutters are provided so as to expose or cover the head access window by rotating in the disc storage portion. The rotational member is provided so as to rotate in the disc storage portion, too. The first and second shutters are interlocked with the rotational member so as to rotate in mutually opposite directions and at respectively different velocities.

31 Claims, 13 Drawing Sheets

U.S. PATENT DOCUMENTS

| | | | |
|---|---|---|---|
| 6,111,726 A * | 8/2000 | Clark et al. .................. 360/133 |
| 6,172,962 B1 | 1/2001 | Goto et al. |
| 6,377,538 B1 | 4/2002 | d'Alayer de Costemore d'Arc |
| 6,414,928 B1 | 7/2002 | Aoki et al. |
| 6,418,114 B1 | 7/2002 | Yamashita |
| 6,463,028 B1 | 10/2002 | Koshiyouji |
| 6,463,029 B1 | 10/2002 | Nishino et al. |
| 6,490,242 B1 * | 12/2002 | Bonn et al. .................. 720/738 |
| 6,583,956 B1 | 6/2003 | Kikuchi et al. |
| 6,693,873 B1 * | 2/2004 | Kondo et al. ............ 369/275.4 |
| 6,728,199 B1 * | 4/2004 | Obata et al. ................. 720/738 |
| 6,820,275 B1 * | 11/2004 | Oishi et al. ................. 720/729 |
| 6,874,159 B1 * | 3/2005 | Inoue ........................ 720/728 |
| 6,971,117 B1 * | 11/2005 | Okazawa et al. ........... 720/738 |
| 6,985,331 B1 * | 1/2006 | Oishi et al. ................. 360/133 |
| 2002/0071375 A1 | 6/2002 | Takahashi et al. |
| 2003/0053409 A1 | 3/2003 | Okazawa et al. |
| 2004/0027985 A1 * | 2/2004 | Inoue ........................ 369/291 |
| 2004/0205809 A1 * | 10/2004 | Saji et al. .................... 720/741 |
| 2005/0240948 A1 * | 10/2005 | Ezawa et al. ............... 720/643 |

FOREIGN PATENT DOCUMENTS

| | | |
|---|---|---|
| EP | 0 866 458 A1 | 9/1998 |
| EP | 1 274 082 A2 | 1/2003 |
| JP | 61-104381 | 5/1986 |
| JP | 61-210577 A | 9/1986 |
| JP | 02214081 A * | 8/1990 |
| JP | 04-067486 | 3/1992 |
| JP | 09-153264 A | 6/1997 |
| JP | 10-031856 | 2/1998 |
| JP | 11-238335 | 8/1999 |
| JP | 11-339424 | 12/1999 |
| JP | 2000-048520 | 2/2000 |
| JP | 2000/048520 A | 2/2000 |
| JP | 2000-090628 | 3/2000 |
| JP | 2000-113630 | 4/2000 |
| JP | 2000132938 A * | 5/2000 |
| JP | 2001093252 A * | 4/2001 |
| JP | 2001-283558 | 10/2001 |
| JP | 2003-178544 | 6/2003 |

* cited by examiner

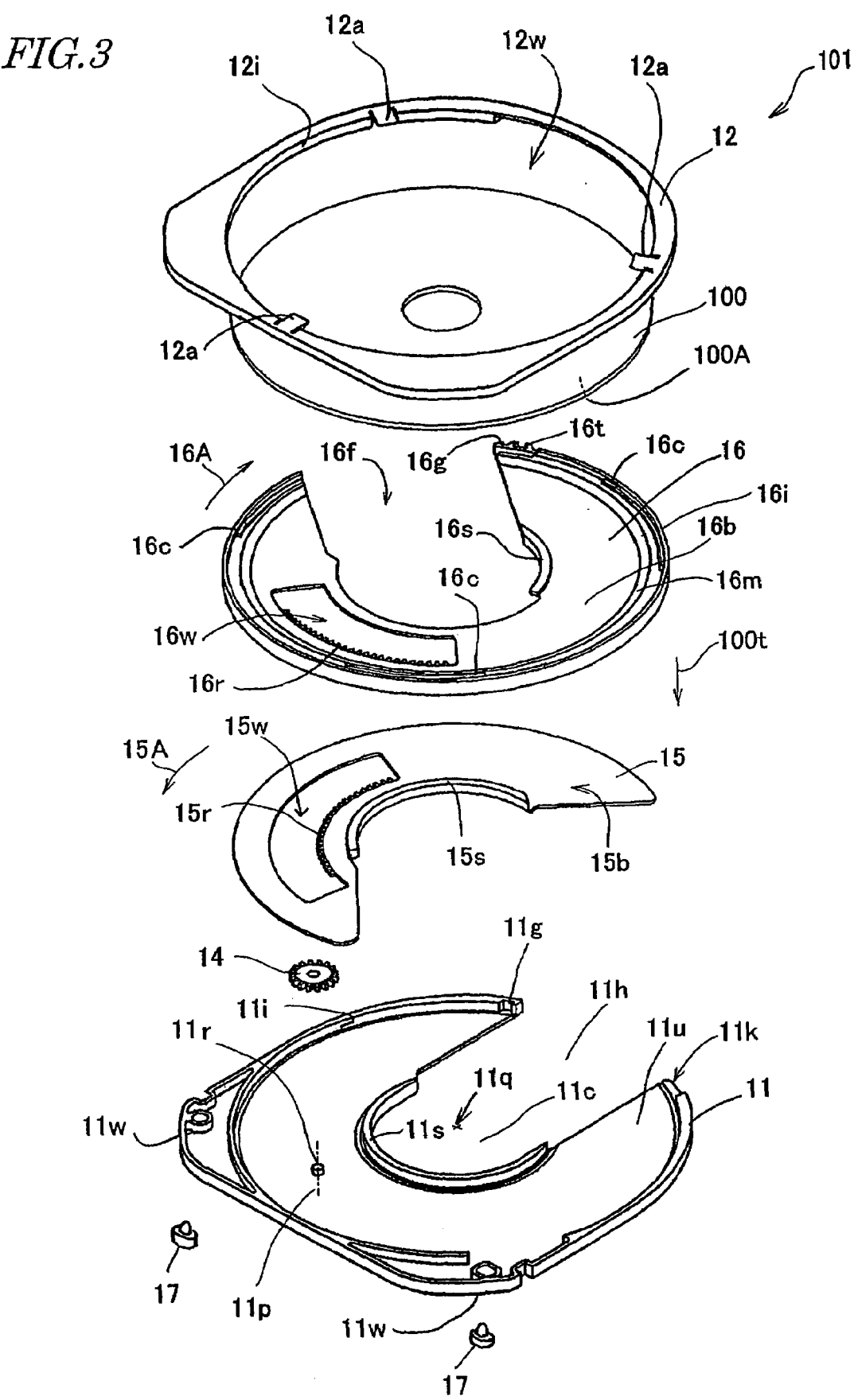

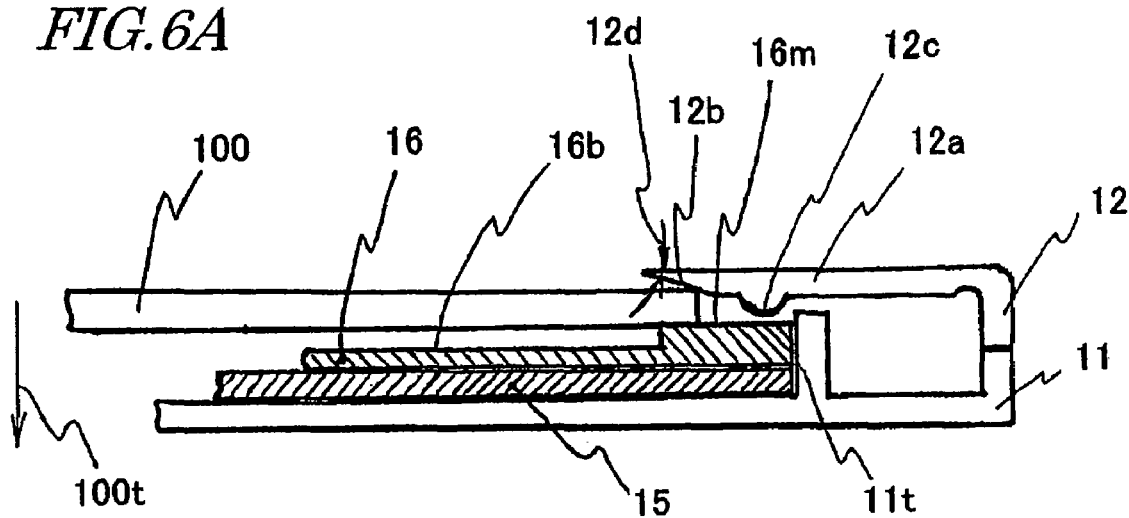
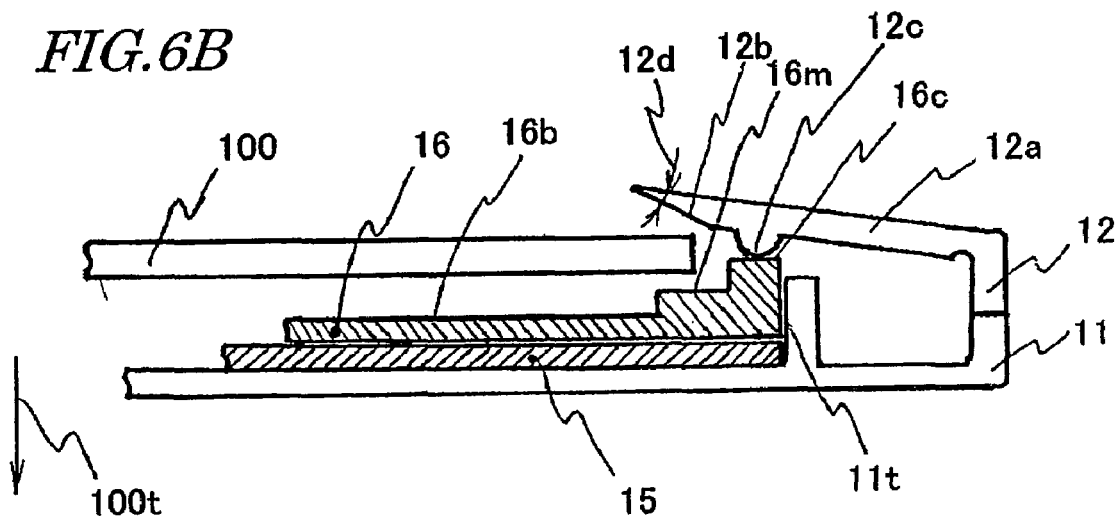

DISC CARTRIDGE

CROSS-REFERENCE TO RELATED APPLICATIONS

This application is a Section 371 of International Application No. PCT/JP2004/004970, filed in the English language on Apr. 6, 2004 but has not yet been Published, the disclosure of which is incorporated herein by reference.

TECHNICAL FIELD

The present invention relates to a disc cartridge for use to store a disk storage medium such as an optical disc or a magnetic disk therein in a rotatable state.

BACKGROUND ART

Various disc cartridges have been proposed as protective cases for a disk-shaped data storage medium having a single or double data storage sides (which will be herein referred to as a "disc" simply).

For example, Japanese Laid-Open Publication No. 9-153264 discloses a disc cartridge in which a disc is completely enclosed in a disc storage portion. The disc storage portion is defined inside of a cartridge body that is made up of upper and lower halves. The cartridge body includes chucking holes and a head access window. The chucking holes allow the turntable of a spindle motor and a clamper to chuck a disc inserted, while the head access window allows a head to read and/or write data from/on the disc. The lower one of the chucking holes is continuous with the head access window. Accordingly, while the operator carries such a cartridge, dust easily enters the inside of the cartridge through these openings and the disc is also easily soiled with finger marks. For that reason, the disc cartridge further includes a shutter for closing these openings up.

A disc cartridge having such a structure, however, has the following drawbacks. Firstly, such a disc cartridge cannot be so thin. This is because the disc storage space, defined between the upper and lower halves, should be thick enough to allow a disc drive to accurately read or write a signal (or information) from/onto the disc stored in such a disc cartridge. The reasons why the disc storage space should be relatively thick include the expected flutter or warp of the disc being rotated and an error that may occur in disposing the disc cartridge at a predetermined position inside of the disc drive.

Secondly, the shutter for closing up these chucking and head access windows at the same time cannot be formed at a low cost, thus increasing the overall manufacturing cost of such a disc cartridge. The reason is as follows. Specifically, the lower half of the disc cartridge is provided with a hole for the turntable of the spindle motor and a head access window, while the upper half thereof is provided with another hole for the clamper. Thus, to close these three openings up at a time, the shutter needs to be formed in a U-shape with a rectangular bottom, which is not so cheap to make.

Thirdly, the disc stored in such a disc cartridge is not fixed in many cases, thus possibly causing dust or fine particle deposition and scratching problems. Specifically, although a disc with a metal hub can be attracted and fixed in position with a magnet, for example, in a disc cartridge so as not to move inconstantly, an optical disc with no hub, e.g., a CD or a DVD, is normally not fixed, but movable freely, in the disc cartridge. Accordingly, if the disc is shaken so much as to contact with the inner walls of the disc cartridge, the data storage side of the disc may get scratched or fine particles may be stirred up and deposited on the disc.

Furthermore, as the shutter is supposed to open or close linearly, the cartridge body needs to be much bigger than the disc to be stored there. If such a disc cartridge is used to store a small-sized disc for a mobile electronic device or a disc camcorder, for example, then the mobile electronic device or the disc camcorder itself must be big enough to house that disc cartridge. In addition, the size of the head access window of a small-sized cartridge is normally different from that of the head access window of a large-sized cartridge. Accordingly, it is difficult to provide a disc drive that can accept both the small-sized and large-sized cartridges. Or at least the structure of such a disc drive becomes overly complicated so as to accept discs of both types.

DISCLOSURE OF INVENTION

In order to overcome at least one of the problems described above, preferred embodiments of the present invention provide a disc cartridge that can have a significantly reduced size.

A disc cartridge according to a preferred embodiment of the present invention preferably includes a cartridge body, first and second shutters, and a rotational member. The cartridge body preferably includes a disc storage portion, a chucking hole and a head access window. The disc storage portion preferably stores a disc therein so that the disc is rotatable in the disc storage portion. The chucking hole is preferably formed on the bottom of the disc storage portion so as to get the disc chucked externally. The head access window is also preferably formed on the bottom of the disc storage portion so as to allow a head, which reads and/or writes data from/on the disc, to access the disc. The first and second shutters are preferably provided in the disc storage portion, for exposing or covering the head access window by rotating in the disc storage portion. The rotational member is preferably provided so as to rotate in the disc storage portion and is preferably interlocked with the first and second shutters. The first and second shutters are preferably interlocked with the rotational member so as to rotate in mutually opposite directions and at respectively different velocities.

A disc cartridge according to another preferred embodiment of the present invention preferably includes a cartridge body, first and second shutters, a rotational member, and a disc holding portion. The cartridge body preferably includes a disc storage portion, a chucking hole and a head access window. The disc storage portion preferably has a disc window and a bottom and preferably stores a disc, having first and second sides, therein so that the disc is rotatable in the disc storage portion and that the first side of the disc is exposed through the disc window. The chucking hole is preferably formed on the bottom of the disc storage portion so as to get the disc chucked externally. The head access window is preferably also formed on the bottom of the disc storage portion so as to allow a head, which reads and/or writes data from/on the second side of the disc, to access the second side of the disc. The first and second shutters are preferably provided in the disc storage portion for exposing or covering the head access window by rotating in the disc storage portion. The rotational member is preferably provided on the bottom of the disc storage portion so as to rotate therein and is preferably interlocked with the first and second shutters. The disc holding portion preferably holds the disc such that the disc is fixed on the cartridge body while the first and second shutters are closed. The first and second shutters are preferably interlocked with the rotational member so as to rotate in mutually opposite directions and at respectively different velocities.

In one preferred embodiment of the present invention, the disc holding portion is preferably interlocked with the first or second shutter so as to hold the disc thereon as the first or second shutter is going to close.

In another preferred embodiment, the disc holding portion preferably releases the disc as the first or second shutter is going to open.

In still another preferred embodiment, the first shutter preferably includes an arced first convex portion around the chucking hole, the second shutter preferably includes an arced second convex portion around the chucking hole, the disc storage portion preferably includes an arced third convex portion around the chucking hole, and the first or second shutter preferably further includes a fourth convex portion along its outer edge. The disc holding portion preferably holds the disc thereon by bringing the second side of the disc into contact with the first, second, third and fourth convex portions.

In this particular preferred embodiment, while the first and second shutters are closed, the disc is preferably fixed in the cartridge body such that a data storage area on the second side of the disc is located between the first, second and third convex portions and the fourth convex portion.

More particularly, at least one of the first and second shutters preferably includes a notch that aligns with the head access window while the first and second shutters are closed. The disc storage portion preferably includes a sidewall along an outer periphery of the bottom. The disc holding portion preferably holds the disc thereon and preferably fixes the disc with respect to the disc storage portion with the center of the disc offset from the center of the disc storage portion such that an outer side surface of the disc contacts with the sidewall of the disc storage portion at a position where the notch is located while the first and second shutters are closed.

More specifically, the disc holding portion preferably includes a first disc holding member and a second disc holding member. While the first and second shutters are closed, the first disc holding member preferably applies outward force to the disc such that the outer side surface of the disc contacts with the sidewall of the disc storage portion, and the second disc holding member preferably applies force to the disc toward the bottom of the disc storage portion.

In an alternative preferred embodiment, the first shutter preferably includes a sidewall around its outer edge, and the sidewall of the first shutter is preferably provided with the notch. While the first and second shutters are closed, the first disc holding member preferably applies force to the disc through the notch.

In this particular preferred embodiment, as the first and second shutters are going to open, rotation of the first shutter preferably brings the first disc holding member into contact with the sidewall of the first shutter, thereby stopping applying the force to the disc.

More particularly, the first shutter preferably includes a guide rib near the inside surface of the sidewall. The second disc holding member is preferably provided for the cartridge body via an elastic member so as to protrude toward the disc window. While the first and second shutters are going to open, the second disc holding member preferably contacts with, and is raised by, the guide rib, thereby releasing the disc.

In yet another preferred embodiment, the disc holding portion preferably includes a plurality of disc holding members, each having a downwardly tapered slope and being arranged along the circumference of the disc, and preferably grips the disc thereon and preferably fixes the disc to the cartridge body by bringing the slopes into contact with the outer side surface of the disc.

In this particular preferred embodiment, the disc holding portion is preferably provided for the cartridge body so as to protrude toward the disc window.

More particularly, the first shutter preferably includes a sidewall around its outer edge and a guide rib near the inside surface of the sidewall. While the first and second shutters are going to open, the disc holding portion preferably contacts with, and is raised by, the guide rib, thereby releasing the disc.

In yet another preferred embodiment, the disc holding portion preferably forms an integral part of the cartridge body.

In yet another preferred embodiment, the first and second shutters are preferably provided in the disc storage portion so as to overlap with each other at least partially.

In yet another preferred embodiment, the rotational member is preferably a gear. The first and second shutters preferably include a first rack and a second rack, respectively. The first and second racks are preferably arced so as to have their centers matched to the center of rotation of the first and second shutters, preferably have mutually different radii, and preferably engage with the rotational member.

In this particular preferred embodiment, the first and second shutters preferably include a first opening and a second opening, respectively, to receive the rotational member.

More particularly, the first rack of the first shutter preferably defines a portion of the first opening, and the second rack of the second shutter preferably defines a portion of the second opening.

In yet another preferred embodiment, the rotational member preferably overlaps with the first and second shutters at least partially while the first and second shutters are open or closed.

In yet another preferred embodiment, the first and second shutters preferably engage with the rotational member along a line that connects the center of rotation of the first and second shutters and that of the rotational member together.

In yet another preferred embodiment, the first and second shutters preferably rotate at a rotational velocity ratio of about 1.2 to about 3.

In yet another preferred embodiment, ends of the first and second shutters preferably overlap with each other in a projection area of the head access window, thereby covering the head access window.

In yet another preferred embodiment, the rotational member is preferably a gear, of which the thickness is approximately equal to the sum of the thicknesses of the first and second shutters.

In yet another preferred embodiment, supposing that a distance from the center of the disc to a first point on the second side of the disc is Rin, where the first point is located closer to the center of the disc than, and defined near, the inner boundary of the disc storage area while the first and second shutters are closed; a distance from the center of the disc to a second point on the second side of the disc is Rout, where the second point is located closer to an outer edge of the disc than, and defined near, the outer boundary of the disc storage area while the first and second shutters are closed; a space having a height S needs to be provided under the second side of the disc; a first circle having a radius of Rout is defined on the second side of the disc; a second circle having a radius of (Rout-1.2S) is defined on a plane that is separated from the second side by a distance of 0.3S and parallel to the second side; and a third circle having a radius of (Rout-16.2S) is defined on a plane that is separated from the second side by the distance S and parallel to the second side, the space is preferably obtained by removing a circular cylinder, having a bottom radius of Rin as measured from the center of the disc and the height S, from first and second truncated cones, where the bottom and top of the first truncated cone are defined by the first and second circles, respectively, and the bottom and top of the second truncated cone are defined by the second and third circles, respectively.

In a specific preferred embodiment, the S is preferably 1 mm, the Rin is preferably 20 mm, and the Rout is preferably 39 mm or 59 mm.

A data storage medium according to a preferred embodiment of the present invention preferably includes the disc cartridge according to any of the preferred embodiments of the present invention described above, and a disc, which is stored in the disc storage portion of the disc cartridge and on which data is ready to be written.

A disc drive according to a preferred embodiment of the present invention is preferably designed so as to be loaded with the disc cartridge according to any of the preferred embodiments of the present invention described above and to read and/or write data from/on a disc that is stored in the disc cartridge.

A disc drive according to another preferred embodiment of the present invention preferably includes drive means for rotating a disc, a head for reading and/or writing data from/on the disc, a supporting structure for supporting the disc cartridge according to one of the preferred embodiments of the present invention described above, which stores the disc therein, at a predetermined position with respect to the drive means, and a shutter opening/closing mechanism for opening the shutters of the disc cartridge and getting the disc released from the disc holding portion so that the disc is rotatable in the disc storage portion of the disc cartridge.

In one preferred embodiment of the present invention, the disc drive preferably further includes a clamper for mounting the disc onto the drive means.

In this particular preferred embodiment, the supporting structure preferably includes a positioning pin for fixing the disc cartridge at the predetermined position.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 3 is an exploded perspective view of the disc cartridge shown in FIGS. 1A and 1B.

FIGS. 6A and 6B are cross-sectional views of a disc holding member as taken in a disc radial direction when the shutters are closed and when the shutters are opened, respectively.

BEST MODE FOR CARRYING OUT THE INVENTION

Embodiment 1

Figure 1A:
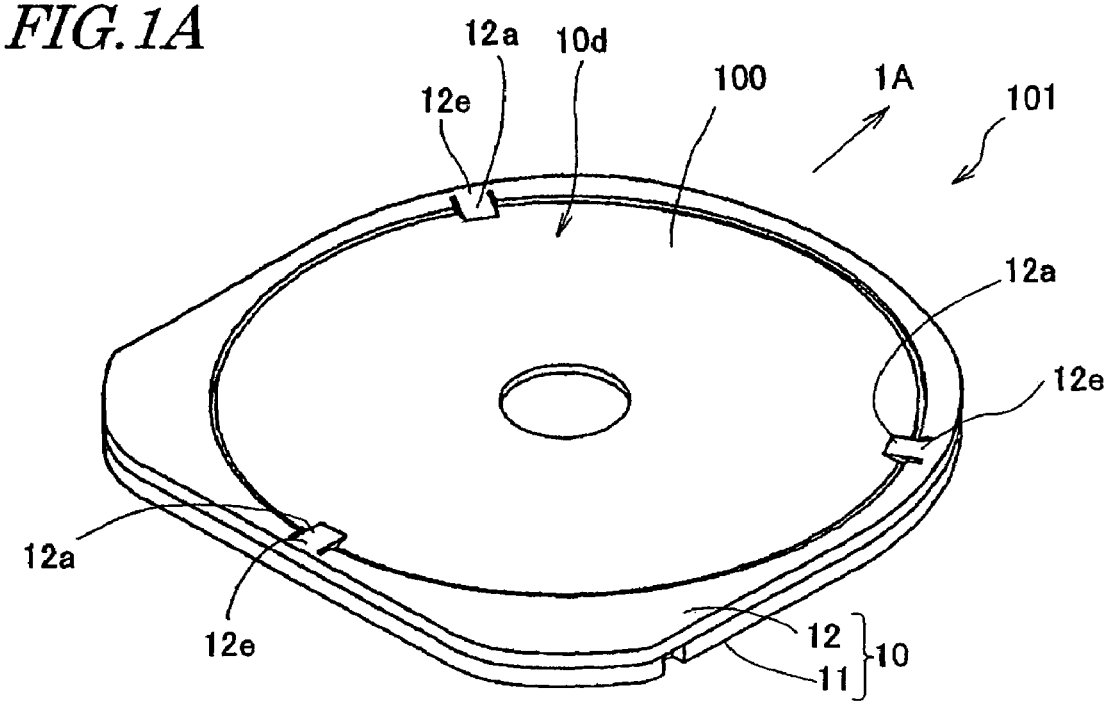
FIGS. 1A and 1B are perspective views of a disc cartridge according to a first specific preferred embodiment of the present invention in a state where a disc is stored there and in a state where no disc is stored there, respectively.
Figure 1B:
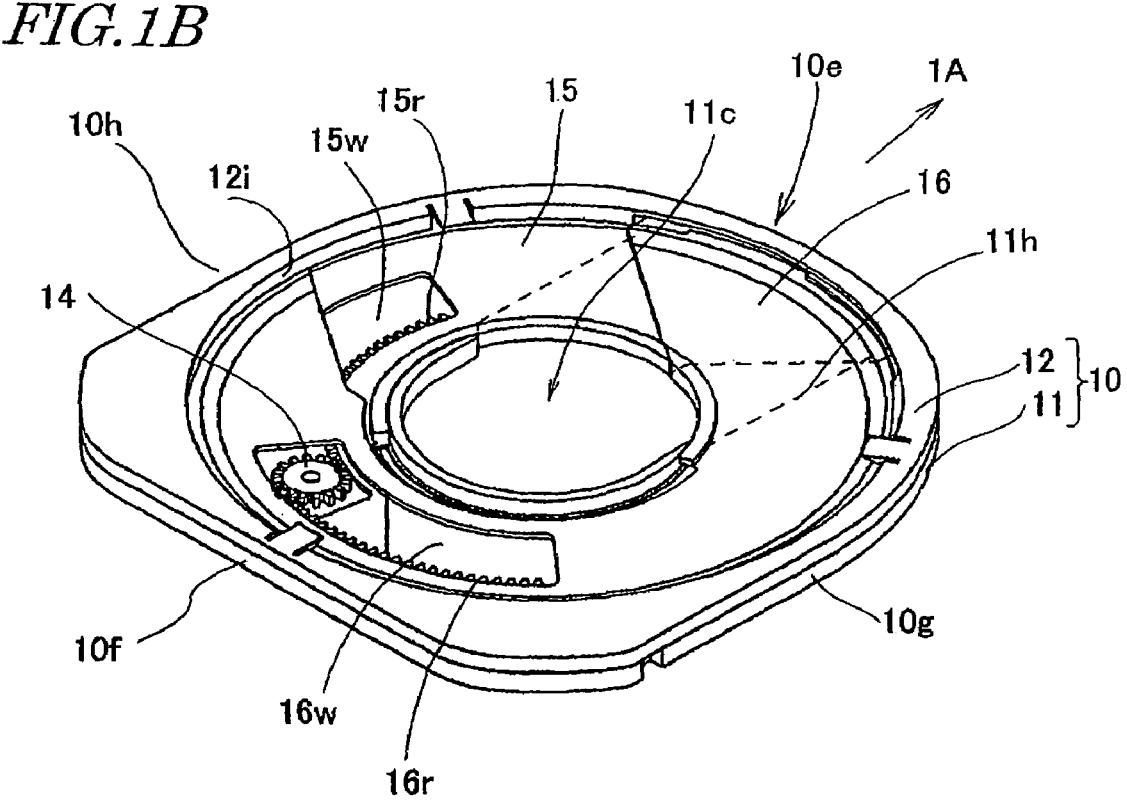
Figure 2:
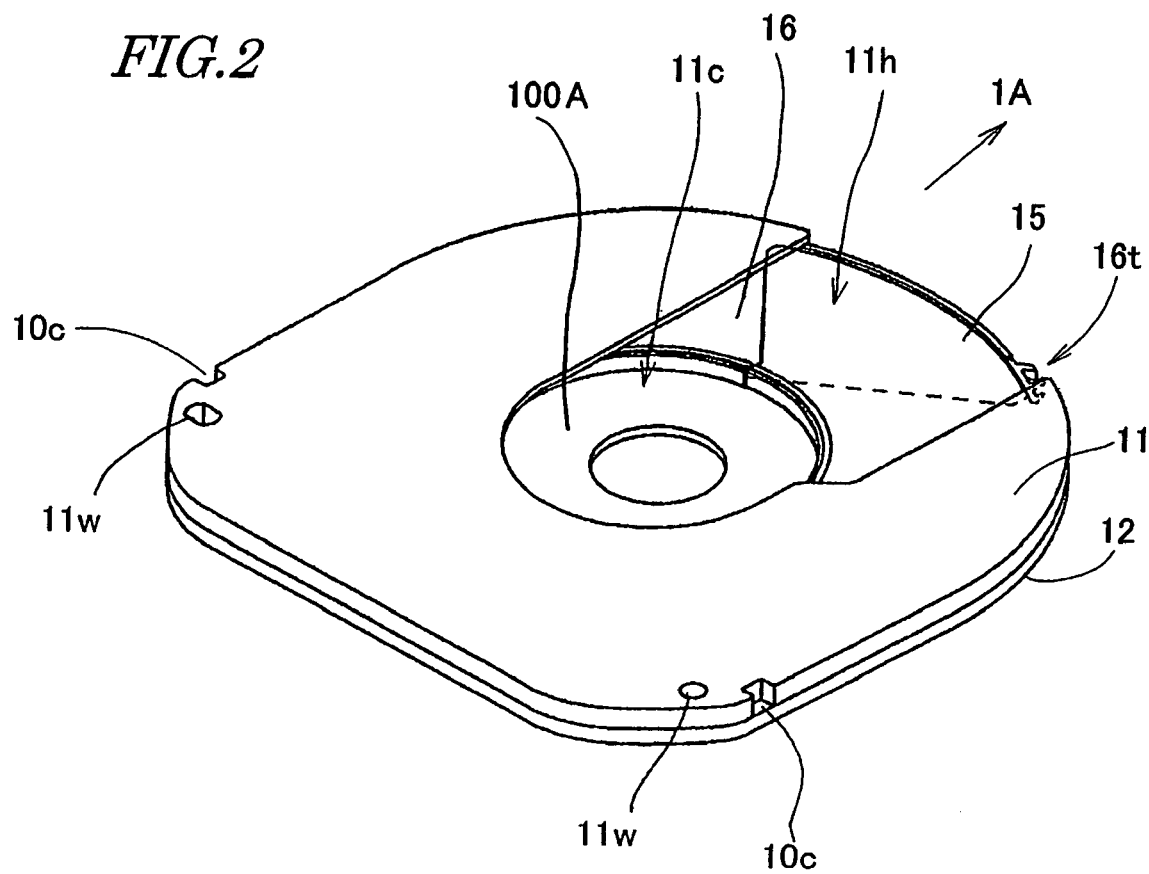
FIG. 2 is a perspective view illustrating the backside of the disc cartridge shown in FIGS. 1A and 1B.
Figure 4A:
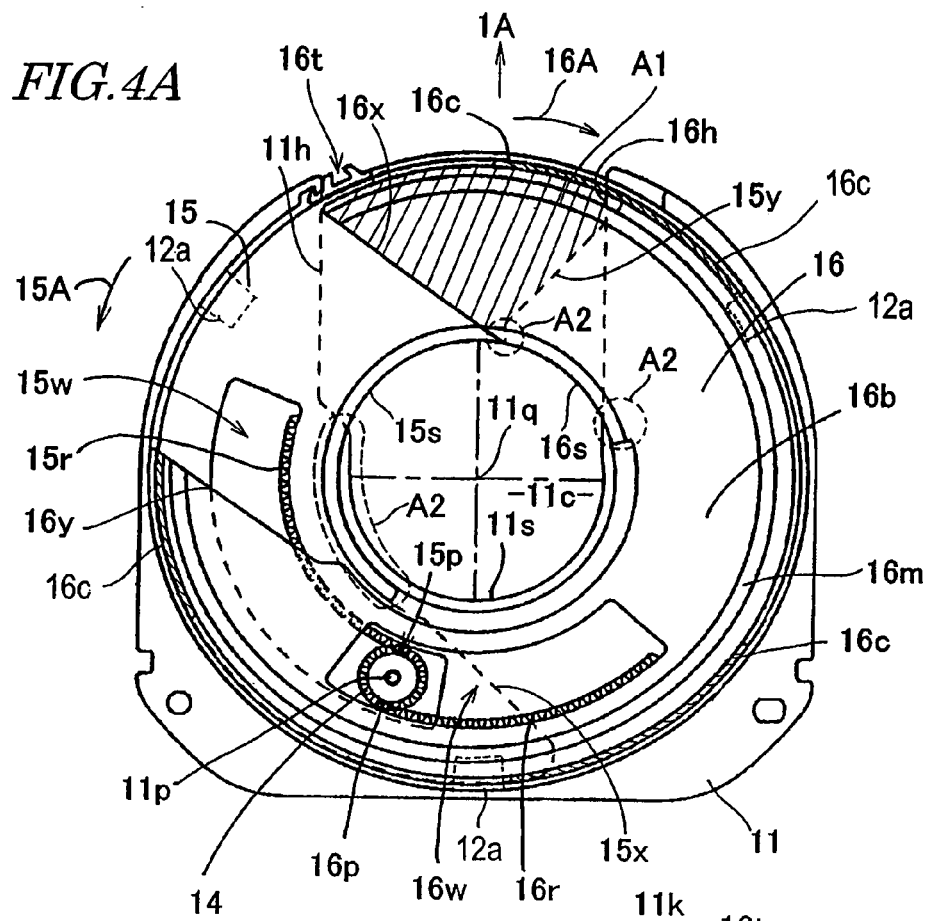
FIGS. 4A and 4B are plan views illustrating the internal structure of the disc cartridge shown in FIGS. 1A and 1B with the cartridge upper shell removed and showing a state where its shutters are closed and a state where its shutters are opened, respectively.
Figure 4B:
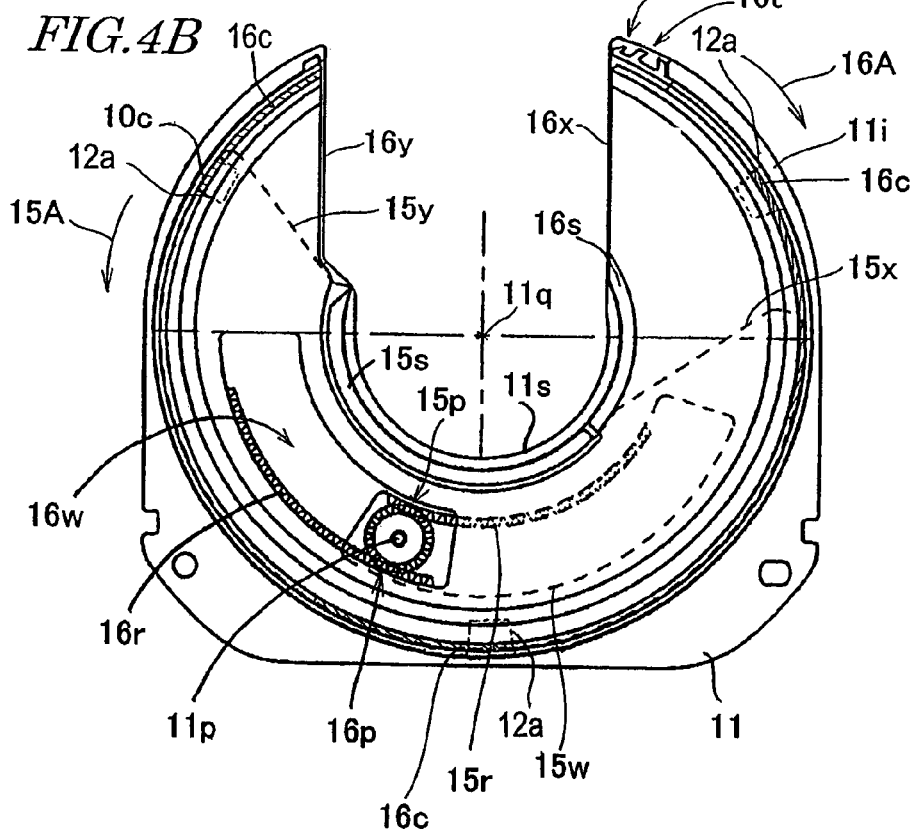

Hereinafter, a disc cartridge according to a first specific preferred embodiment of the present invention will be described. FIGS. 1A and 1B are perspective views illustrating the upper part of a disc cartridge 101 according to the first preferred embodiment in a state where a disc 100 is stored there and in a state where no disc 100 is stored there, respectively. FIG. 2 is a perspective view illustrating the backside of the disc cartridge 101. FIG. 3 is an exploded perspective view of the disc cartridge 101. FIGS. 4A and 4B are plan views illustrating the internal structure of the disc cartridge 101 with the cartridge upper shell 12 removed and showing a state where first and second shutters 16 and 15 are closed and a state where the shutters 16 and 15 are opened, respectively. It should be noted that the overall disc cartridge 101 including the disc 100 therein will be sometimes referred to herein as just a "disc" or "data storage medium".

The disc 100 preferably includes a first side and a second side. The first side of the disc 100, on which its label, for example, is normally printed, is illustrated in FIG. 1A, while the second side thereof, i.e., the data storage side 100A, is illustrated as the backside in FIGS. 2 and 3.

As shown in FIG. 3, the disc cartridge 101 preferably includes a cartridge lower shell 11, a cartridge upper shell 12, a gear 14, a first shutter 16 and a second shutter 15.

As shown in FIG. 3, the cartridge lower shell 11 preferably includes a chucking hole 11c and a head access window 11h. The chucking hole 11c preferably allows a chucking member (e.g., a spindle motor for rotating the disc 100) to enter the disc cartridge 101 externally. The head access window 11h preferably allows a head, which reads and/or writes data from/on the data storage side 100A of the disc 100, to enter the disc cartridge 101 and access a target location on the disc 100. The chucking hole 11c and head access window 11h are preferably continuous with each other. A third convex portion 11s is preferably provided so as to surround the chucking hole 11c. The head access window 11h preferably reaches a side surface of the cartridge lower shell 11.

The cartridge lower shell 11 preferably includes two positioning holes 11w, which engage with cartridge positioning pins 17 of a disc drive (not shown), thereby setting the disc cartridge 101 at a predetermined position in the disc drive. Optionally, the cartridge body may include a pair of concave portions 10c as either pull-in notches or positioning recesses when the disc cartridge 101 is pulled in and loaded into a disc drive or when the disc cartridge 101 is stored in a changer. The cartridge lower shell 11 preferably faces the data storage side 100A of the disc 100.

The cartridge upper shell 12 preferably has a circular disc window 12w, which expands over the entire projection area of the disc 100 so as to expose the upper side of the disc 100. The cartridge upper and lower shells 12 and 11 are preferably bonded or welded together at their outer edges, thereby forming a cartridge body 10. As will be described in detail later, disc holding members 12a preferably protrude into the disc window 12w.

A disc storage portion 10d for storing the disc 100 therein is preferably defined by an inside surface 11u of the cartridge lower shell 11 and a sidewall 12i of the cartridge upper shell 12. The inside surface 11u is preferably opposed to the data storage side 100A of the disc 100, while the sidewall 12i preferably has a substantially cylindrical shape and preferably defines the disc window 12w inside. That is to say, the inside surface 11u becomes the bottom of the disc storage portion 10d.

In the disc storage portion 10d, a gap, which is wide enough to allow the disc 100 to rotate freely, is preferably provided between the sidewall 12i and the outer edge of the disc 100. That is to say, the diameter of the circle defined by the disc window 12w and sidewall 12i should be bigger than that of the disc 100 to be stored. Also, the upper half of the disc storage portion 10d preferably defines the disc window 12w so that the disc 100 stored in the disc storage portion 10d has one of its two sides fully exposed through the disc window 12w.

As shown in FIG. 1B, the disc cartridge 101 is preferably loaded into a disc drive in the direction indicated by the arrow 1A such that the side surface 10e with the head access window 11h faces the disc drive. In this preferred embodiment, the side surface 10e is preferably a convex curved surface. Thus, as viewed from the disc window 12w, the disc cartridge can have a reduced size, and the disc drive to be loaded with such a disc cartridge 101 can also have a reduced size. Also, if the other side surfaces 10f, 10g and 10h are flat surfaces, the insert direction 1A of the disc cartridge 101 can be easily known by the shape of the disc cartridge 101. Thus, the user can insert this disc cartridge 101 into the disc drive correctly even without checking the insert direction shown on the surface of the disc cartridge 101.

As shown in FIG. 3, each of the first and second shutters 16 and 15 preferably has the shape of a partially notched ring, of which the inside diameter is defined by the diameter of the chucking hole 11c. More specifically, the first shutter 16 preferably has a notch 16f, of which the dimensions and shape are almost the same as those of the head access window 11h of the cartridge lower shell 11. In this preferred embodiment, the second shutter 15 is preferably shaped so as to be slightly bigger than a half ring. These shutters are preferably arranged between the data storage side 100A of the disc 100 and the inside surface 11u of the disc storage portion 10d such that the second shutter 15 is sandwiched between the first shutter 16 and the bottom of the disc storage portion 10d.

An arced first convex portion 16s and an arced second convex portion 15s are preferably provided along the inner edges of the first and second shutters 16 and 15, respectively. An arced fourth convex portion 16m is preferably further provided along the outer edge of the first shutter 16. The first and second convex portions 16s and 15s are preferably arcs with a greater radius than that of the third convex portion 11s of the cartridge lower shell 11 so as not to interfere with the third convex portion 11s. This cartridge 101 is preferably designed such that the first, second, third and fourth convex portions 16s, 15s, 11s and 16m all have an equal height. Also, in this cartridge 101, these convex portions are preferably located inside and outside of the data storage area of the disc 100 to be stored in the disc storage portion 10d. Furthermore, a standup wall 16i is preferably provided along the outer edge of the first shutter 16 and includes an opener/closer 16t. Also, a number of guide ribs 16c are preferably provided on the fourth convex portion 16m.

The first and second shutters 16 and 15 preferably slide and rotate around the center 11q of rotation of shutters, which is the center of the chucking hole 11c, such that each of the first and second convex portions 16s and 15s overlaps and keeps contact with the third convex portion 11s provided around the chucking hole 11c. As shown in FIG. 2, when the shutters are closed, the ends of the first and second shutters 16 and 15 are preferably both located within the head access window 11h and preferably overlap with each other, thereby covering the head access window 11h. Alternatively, the first and second shutters 16 and 15 may also slide and rotate while making contact with the sidewall 11i provided around the outer edge of the shutter 16.

The gear 14 is preferably supported in a rotatable state on a rotation shaft 11r, which is provided for the cartridge lower shell 11. No matter whether the first and second shutters 16 and 15 are opened or closed, the rotation shaft 11r is preferably always located within their mutually overlapping projection area on the cartridge lower shell 11. The gear 14 is preferably designed such that its thickness is approximately equal to the sum of the thicknesses of the first and second shutters 16 and 15.

A first rack 16r and a second rack 15r, the arcs of which are also defined with respect to the center 11q of rotation of the shutters (i.e., the center of the chucking hole 11c), are preferably provided for the first and second shutters 16 and 15, respectively. In addition, a first window 16w and a second window 15w are preferably further provided for the first and second shutters 16 and 15, respectively, such that the shutters rotating do not interfere with the gear 14. The first and second racks 16r and 15r preferably define a portion of the first window 16w and a portion of the second window 15w, respectively. The first and second racks 16r and 15r preferably engage with the gear 14 on a line that connects the center 11q of rotation of the shutters to the center 11p of rotation of the gear 14 so as to slide and rotate in mutually opposite directions. That is to say, the gear 14 preferably functions as a rotational member that interlocks with the first and second shutters 16 and 15.

Hereinafter, it will be described how the first and second shutters 16 and 15 work. As shown in FIG. 4A, in the state where the head access window 11h is covered with the first and second shutters 16 and 15 closed, one (16x) of the two edges 16x and 16y that define the notch 16f of the first shutter 16 is preferably located within the head access window 11h. Accordingly, the head access window 11h cannot be fully covered with only the first shutter 16 because a portion of the notch 16f of the first shutter 16 is located within the head access window 11h. However, the second shutter 15 is preferably overlapped by the first shutter 16 so as to close up the notch 16f of the first shutter 16 completely. In this manner, the first and second shutters 16 and 15 cooperate with each other so as to cover the head access window 11h. At this point in time, one end 15y of the second shutter 15 is preferably located within the head access window 11h. As shown in FIG. 4A, the first and second shutters 16 and 15 preferably overlap with each other in a relatively broad area A1 within the head access window 11h, thus preventing dust and other foreign particles from entering the data storage side of the disc 100 through the head access window 11h while the shutters are closed. Also, by overlapping these two shutters in an increased area within the head access window 11h, the overall disc cartridge 101 can have increased rigidity while its shutters are closed.

In this state, the first, second and third convex portions 16s, 15s and 11s are arranged in circle around the chucking hole 11c so as to surround the chucking hole 11c completely. Also, the first, second and third convex portions 16s, 15s and 11s preferably overlap with each other in a number of areas A2 in the radial direction.

As will be described in detail later, while the shutters are closed, the respective disc holding members 12a preferably press the disc 100 toward its center and the bottom of the disc storage portion 10d. Accordingly, in the disc storage portion 10d, the disc 100 is preferably fixed while being pressed by the disc holding members 12a against the first shutter 16. The outer edge of the data storage side 100A of the disc 100 preferably contacts with the fourth convex portion 16m, while the inner edge thereof preferably contacts with the first, second and third convex portions 16s, 15s and 11s. In this manner, the data storage area of the disc 100 is preferably exposed to the space that is defined between the fourth convex portion 16m and the first, second and third convex portions 16s, 15s and 11s. As shown in FIG. 3, the fourth convex portion 16m is absent from the notch 16f. Accordingly, this space is not completely closed. However, very little dust reaches the data storage side 100A of the disc 100, held in the disc storage portion 10d, from the label side thereof by way of the notch 16f. Also, the chucking hole 11c is entirely surrounded with the first, second and third convex portions 16s, 15s and 11s, thus preventing dust from reaching the data storage area of the disc 100 through the chucking hole 11c. Furthermore, the data storage area does not contact with the first shutter 16. Accordingly, no scratches should be made on the data storage area.

When the disc cartridge 101 is inserted into a disc drive in the direction indicated by the arrow 1A, an opening/closing lever (not shown) provided for the disc drive preferably moves the opener/closer 16t of the first shutter 16 in the direction indicated by the arrow 16A. Then, the first shutter 16 rotates around the chucking hole 11c in the direction indicated by the arrow 16A. As the first shutter 16 rotates, the rack 16r thereof rotates the gear 14. As a result, the gear 14 gets engaged with the rack 15r, thereby driving the second shutter 15. Then, the second shutter 15 rotates around the chucking hole 11c in the direction indicated by the arrow 15A, which is opposite to the direction in which the first shutter 16 rotates. As the first and second shutters 16 and 15 rotate, the head access window 11h is going to be exposed gradually. In this case, the first shutter 16 preferably keeps rotating until the notch 16f gets aligned with the head access window 11h of the cartridge lower shell 11. On the other hand, both ends 15y and 15x of the second shutter 15 are preferably located so as to sandwich the head access window 11h between them.

The first and second shutters 16 and 15 opening or closing do not rotate at the same rotational velocity. But the rotational velocities of the first and second shutters 16 and 15 are inversely proportional to the distance between the center 11q of rotation of the shutters and a point 16p where the rack 16r engages with the gear 14 and the distance between the center 11q of rotation of the shutters and a point 15p where the rack 15r engages with the gear 14, respectively. Accordingly, the angle of rotation of the first shutter 16 opening or closing is different from that of the second shutter 15 opening or closing. In this preferred embodiment, the angle of rotation needed to open or close the second shutter 15 is preferably 1.2 to 3 times as large as that needed to open or close the first shutter 16. Thus, by rotating the opener/closer 16t to just 40 to 60 degrees, the head access window 11h can be exposed or covered just as intended.

As will be described later, when the two closed shutters start to rotate and open, the disc holding members 12a preferably move away from the disc 100 as the first shutter 16 rotates. In this manner, the disc 100 is released from the hold by the disc holding members 12a and gets ready to rotate in the disc storage portion 10d. Nevertheless, since the disc holding members 12a move while protruding from the disc window 12w, the disc 100 will never drop through the disc window 12w.

In this manner, in the preferred embodiment described above, the two shutters preferably rotate in the opposite directions synchronously with each other. Accordingly, a big opening can be created even by rotating one of the two shutters to just a small degree. Such a structure can make this disc cartridge compatible with a large-diameter disc. That is to say, this structure can be effectively applicable for use in a disc cartridge that is designed to store a small-diameter disc but has a head access window which is as wide as the counterpart of a large-diameter disc cartridge.

In addition, according to this preferred embodiment, the gear to interlock the two shutters together is preferably provided in the disc storage portion, thus contributing to reducing the overall size of the disc cartridge. For that reason, the present invention is particularly effectively applicable for use in a small-diameter disc cartridge that needs to have a reduced overall size.

Figure 5A:
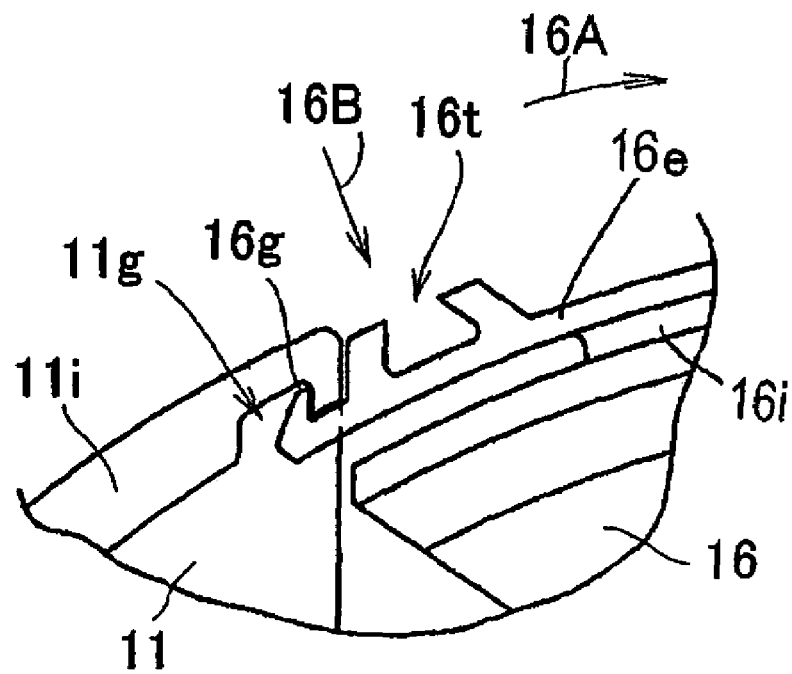
FIGS. 5A and 5B are plan views illustrating the structure of a portion of the disc cartridge shown in FIGS. 1A and 1B in the vicinity of its opener/closer.
Figure 5B:
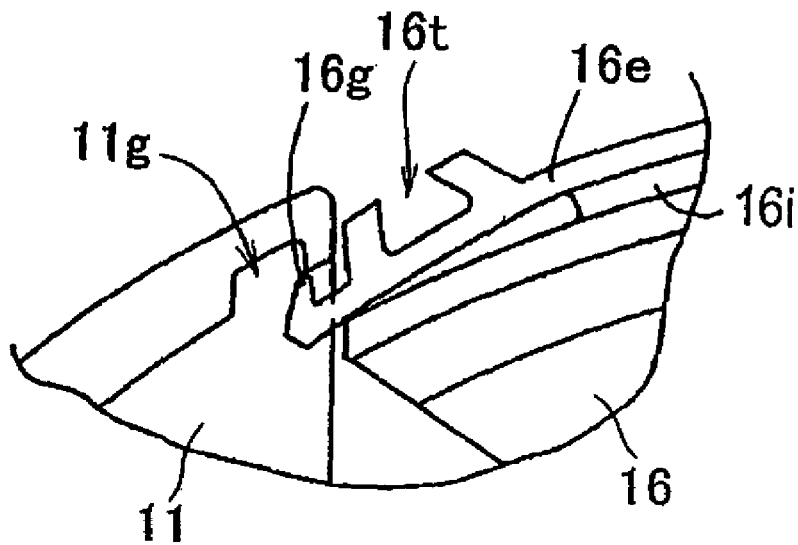

Next, the opener/closer 16t will be described. FIGS. 5A and 5B are plan views illustrating the structure of a portion of the disc cartridge 101 in the vicinity of its opener/closer 16t on a larger scale. As shown in FIG. 5A, the opener/closer 16t is preferably connected to the standup wall 16i of the first shutter 16 by way of an elastic member 16e. An engaging convex portion 16g is preferably provided at the end of the opener/closer 16t. On the other hand, the cartridge lower shell 11 is preferably provided with a concave portion 11g. While the shutters are closed, the engaging convex portion 16g of the first shutter 16 is preferably engaged with and locked to the concave portion 11g of the cartridge lower shell 11. Thus, the first shutter 16 cannot rotate in that state. Also, since the first shutter 16 is engaged with the gear 14 that is in turn engaged with the second shutter 15, the second shutter 15 cannot rotate, either. That is to say, the shutters can be kept closed.

To open the shutters, the opener/closer 16t needs to be pushed down toward the center of the disc as indicated by the arrow 16B. Then, the concave portion 11g and engaging convex portion 16g disengage themselves, thus continuing to move the opener/closer 16t in the direction indicated by the arrow 16B. Then, the first shutter 16 can be rotated in the direction indicated by the arrow 16A. The second shutter 15 also starts to rotate by way of the gear 14.

As shown in FIGS. 4A and 4B, while the shutters are closed, the opener/closer 16t is preferably located within the head access window 11h. On the other hand, when the shutters are opened, the opener/closer 16t is preferably housed in the notch 11k of the sidewall 11i of the cartridge lower shell 11. Accordingly, even if the head of the disc drive accesses the head access window 11h, the opener/closer 16t never interferes with the access of the head.

Hereinafter, it will be described with reference to FIGS. 3, 4A, 4B, 6A and 6B how the multiple disc holding members 12a, dispersed around the circumference of the disc 100, hold the disc 100. FIG. 6A is a cross-sectional view of one of the disc holding members 12a as taken in the disc radial direction when the first and second shutters 16 and 15 cover the head access window 11h and hold the disc 100 thereon. On the other hand, FIG. 6B is a cross-sectional view of the disc holding member 12a as taken in the disc radial direction when the first and second shutters 16 and 15 have exposed the chucking hole 11c and the head access window 11h and released the disc 100 to allow it to rotate in the disc cartridge 101.

Each of the disc holding members 12a is preferably partly separated from the cartridge upper shell 12 via slits so as to partially protrude into the disc window 12w, and is preferably connected as an integral part to the cartridge upper shell 12 by way of an elastic portion 12e. A number of such disc holding members 12a are preferably arranged along the circumference of the disc. In this preferred embodiment, three disc holding members 12a are preferably provided. As shown in FIG. 6A, the end of each disc holding members 12a is preferably provided with a slope 12b, which is inclined so as to stick out over the projection area of the disc and the outer edge of the disc 100. The disc holding member 12a preferably brings the slope 12b into contact with either the outer edge 100c of the disc 100 or the outer boundary of the first side of the disc 100, thereby gripping the disc 100 thereon, pressing the disc 100 in the thickness direction as indicated by the arrow 100t, and bringing the data storage side 100A (i.e., the second side) of the disc 100 into plane contact with the first, second, third and fourth convex portions 16s, 15s, 11s and 16m as shown in FIG. 4A. As a result, the disc 100 is held and fixed on the inner and outer edges of the data storage side 100A except its data storage area. Also, the data storage area of the data storage side 100A of the disc 100 is roughly sealed with a certain gap allowed between the data storage area and the concave portion 16b. Consequently, no dust will enter or deposit on the data storage area of the data storage side 100A. In such a state, the guide rib 12c indicated by oblique lines is separate from the disc holding member 12a as shown in FIG. 4A.

While the shutters are closed and the disc 100 is held by the disc holding members 12a, the center of the disc 100 preferably matches to the center 11q of the chucking hole 11c. The center of the chucking hole 11c is also the center of the disc storage portion 10d.

As shown in FIGS. 4B and 6B, when the two closed shutters start to rotate and open, a guide rib 16c, provided for the first shutter 16, preferably makes contact with convex portions 12c (as indicated by oblique lines in FIG. 4B) on the respective inside surfaces of the disc holding members 12a, thereby lifting the disc holding members 12a. As a result, the disc 100 is released from the grip of the slopes 12b and gets ready to rotate. At this point in time, the disc holding members 12a still stick out into or over the disc window 12w and still overhang a portion of the projection area of the disc (i.e., the outer edge thereof). Accordingly, even if the disc 100 is released in a disk drive that is designed so as to mount the disc 100 vertically, the disc 100 will not drop down from the disc cartridge 101. That is to say, even if the disc cartridge is supposed to be used so as to be vertically loaded into a disc drive, the disc holding members 12a can prevent the disc 100 from dropping down through the disc window 12w. Optionally, the disc holding members 12a may be connected as integral parts to the cartridge lower shell 11 via elastic members.

As described above, by bringing the convex portions 12c of the disc holding members 12a into contact with the guide rib 16c, the disc holding members 12a can be lifted and the disc 100 can be released. Accordingly, if the location and the circumferential length of the guide rib 16c are adjusted with respect to the disc holding members 12a, the disc 100 can be released or gripped at an appropriate timing during the shutter opening or closing operation. It should be noted, however, that not all of the convex portions 12c of the three disc holding members 12a have to make contact with the guide rib 16c at the same time.

As described above, the disc holding members 12a also function as stopper members for preventing the disc 100 from dropping down through the disc window 12w while the shutters are going to be opened or closed. In the preferred embodiment described above, the disc holding members 12a preferably form integral parts of the cartridge upper shell 12. Accordingly, it is difficult to insert any disc 100 through the disc window 12w after the disc cartridge 101 has been assembled. For that reason, in this preferred embodiment, the disc 100 is preferably put in the disc storage portion during the assembly process of the disc cartridge 101.

Hereinafter, the structure of the concave portion 16b of the first shutter 16 will be described with reference to FIGS. 7 through 10. The disc cartridge according to any of various preferred embodiments of the present invention described above stores a disc therein with one side of the disc exposed unlike the conventional disc cartridge. Thus, the disc cartridge of the present invention can be thinner than the conventional one. Also, since the label side of the disc is displayed, the overall disc cartridge can have a good design.

However, since one side of the disc is supposed to be exposed in this disc cartridge, the user may touch the label side of the disc. Accordingly, a careless user might press the label side of the disc too strongly. Thus, the disc cartridge of this type should hold the disc in such a manner as to prevent the data storage side of the disc from getting scratched or the disc itself from being deformed even in such a situation. In view of these potential unfavorable situations, the present inventors carried out an intensive research on exactly in what shape the concave portion 16b of the first shutter 16 should be formed to hold the disc without making any scratches on the data storage side of the disc.

Figure 7:
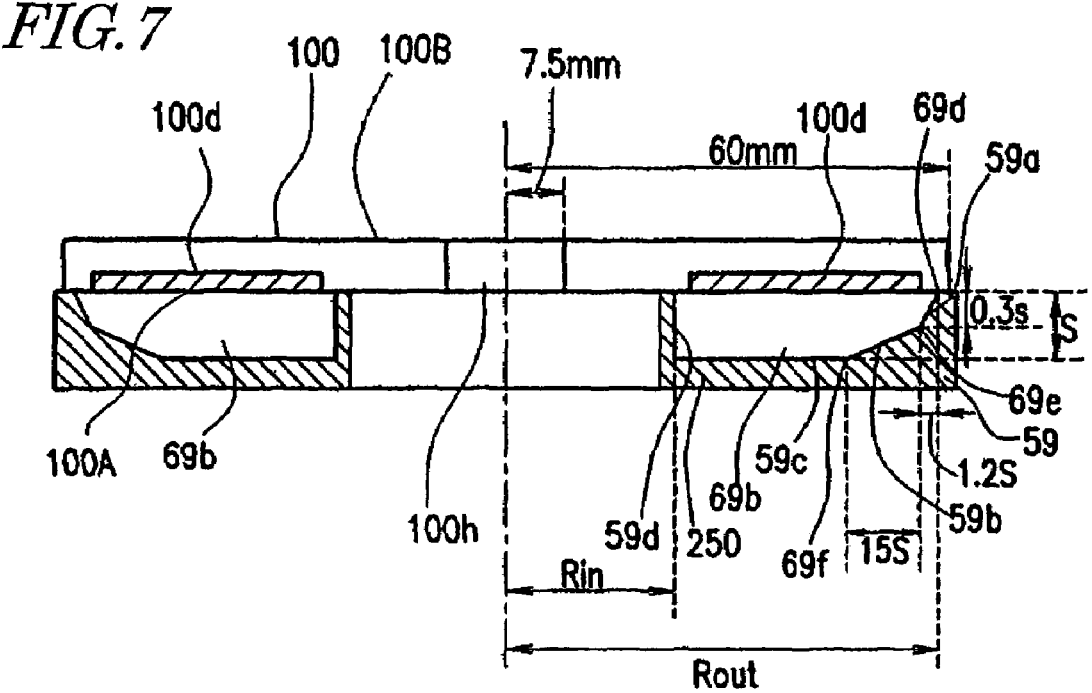
FIG. 7 is a cross-sectional view illustrating a space to be provided under a disc stored in a disc cartridge according to a preferred embodiment of the present invention.

FIG. 7 illustrates a holding structure 59 (made up of the first, second, third and fourth convex portions 16s, 15s, 11s and 16m) for holding the disc 100 thereon and a space to be provided under the data storage area 100d of the disc 100 so that the data storage area 100d will not get scratched by the holding structure 59 even if the disc 100 is pressed by the user too strongly. It should be noted that the sizes of some portions of the holding structure 59 are not to scale in FIG. 7 so as to make the features of the holding structure 59, which defines that space, clearly understandable. Accordingly, the aspect ratio illustrated in FIG. 7 is different from the actual one.

If plenty of space was allowed under the disc 100, the height of the space had only to be slightly greater than the maximum flexure of the disc 100. This is because, in that case, the disc 100 would never contact with the holding structure 59 no matter how much the disc 100 was deformed. However, a disc cartridge with such an ample space would be too thick. So the space under the disc 100 should actually be minimized. To minimize the space, the disc 100 needs to be held so as to have as small flexure as possible. And to reduce the flexure, portions of the disc 100 to be held by the holding structure 59 are preferably as close to the data storage area 100d of the disc 100 as possible. As shown in FIG. 7, the portions of the holding structure 59, on which the data storage side 100A of the disc 100 is supported, are preferably defined by an inner radius Rin and an outer radius Rout. That is to say, the disc 100 is held not only by the inside portion of the holding structure 59 that is located inside of the inner radius Rin but also by the outside portion of the holding structure 59 that is located outside of the outer radius Rout. The "inner radius Rin" is herein supposed to be a distance from the center of the disc 100 to a point that is located closer to the center of the disc 100 than, and defined near, the inner boundary of the data storage area 100d. On the other hand, the "outer radius Rout" is herein supposed to be a distance from the center of the disc 100 to a point that is located closer to the outer edge of the disc 100 than, and defined near, the outer boundary of the data storage area 100d. As described above, these two points that define the inner and outer radii Rin and Rout are as close to the data storage area 100d as possible. For example, if the disc 100 has a diameter of about 5 inches (i.e., a radius of about 60 mm), then the inner radius Rin is preferably about 20 mm and the outer radius Rout is preferably about 59 mm. On the other hand, if the disc 100 has a diameter of about 80 mm, then the inner radius Rin is preferably about 20 mm and the outer radius Rout is preferably about 39 mm.

The space 69b to be provided under the disc 100 to prevent the data storage area 100d from getting scratched is preferably defined in the following manner. First, the height (or the depth) S (mm) of the space 69b is defined. Next, three circles 69d, 69e and 69f are defined. Specifically, the circle 69d has a radius that is equal to the outer radius Rout and is defined on the data storage side 100A; the circle 69e has a radius obtained by (Rout-1.2S) and is defined on a plane that is parallel to, and 0.3S mm separated from, the data storage side 100A; and the circle 69f has a radius obtained by (Rout-16.2S) and is defined on a plane that is parallel to, and S mm separated from, the data storage side 100A. A truncated cone, of which the top and bottom are defined by the circles 69d and 69e, respectively, has a side surface 59a, while another truncated cone, of which the top and bottom are defined by the circles 69e and 69f, respectively, has a side surface 59b.

A circular cylinder is also defined so as to have a circular bottom with the radius Rin as measured from the center of the disc 100 and a side surface 59d with the height (or depth) S as measured from the data storage side 100A. The space 69b to be provided under the data storage area 100d is obtained by removing the circular cylinder, defined by the side surface 59d, from the two-stepped truncated cone defined by the side surfaces 59a and 59b.

The S value defines the height of the space 69b. Accordingly, the greater the S value, the less likely the data storage area 100d gets scratched even if the disc 100 is deformed. However, as the S value is increased, the disc cartridge increases its thickness. Thus, to make a thin disc cartridge, the S value is preferably as small as possible. The present inventors discovered and confirmed via experiments that if the disc 100 had a diameter of 5 inches, an S value of 0.8 mm to 1.0 mm was great enough to protect the data storage area 100d of the disc 100 from scratches as long as the flexure of the disc 100 was caused by a pressure that was manually applied by the user. The S value is preferably 1.0 mm. We also discovered that if the disc 100 had a diameter of 80 mm, an S value of 0.5 mm to 0.8 mm was great enough to protect the data storage area 100d of the disc 100 from scratches as long as the flexure of the disc 100 was caused by a pressure that was manually applied by the user.

Figure 8:
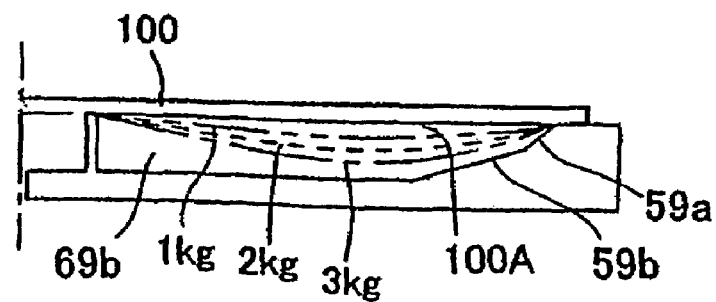
FIG. 8 is a cross-sectional view illustrating the flexure of the disc.

FIG. 8 schematically illustrates how much the disc 100 is deformed if the space 69b is provided under the disc 100 with the S value set to 1 mm and a pressure is applied onto the disc 100 toward the space 69b. The present inventors discovered and confirmed via experiments that the pressure that was applied manually onto the disc 100 by the user never exceeded 3 kg. The present inventors also discovered that even when the maximum pressure of 3 kg was applied, the disc 100 was bent fully within the space 69b and never contacted with the side surface 59a or 59b.

Figure 9:
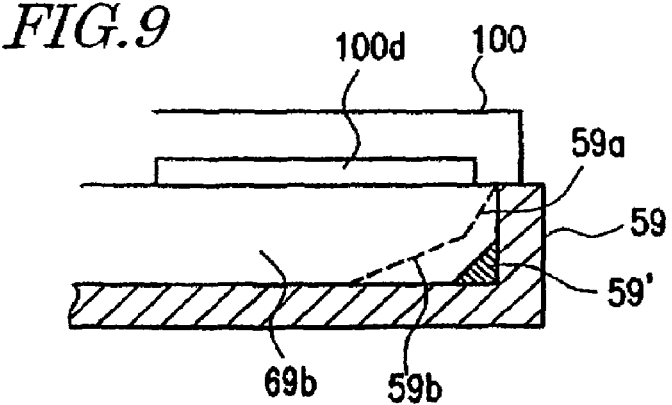
FIG. 9 is a cross-sectional view illustrating another exemplary space to be provided under the disc.
Figure 10:
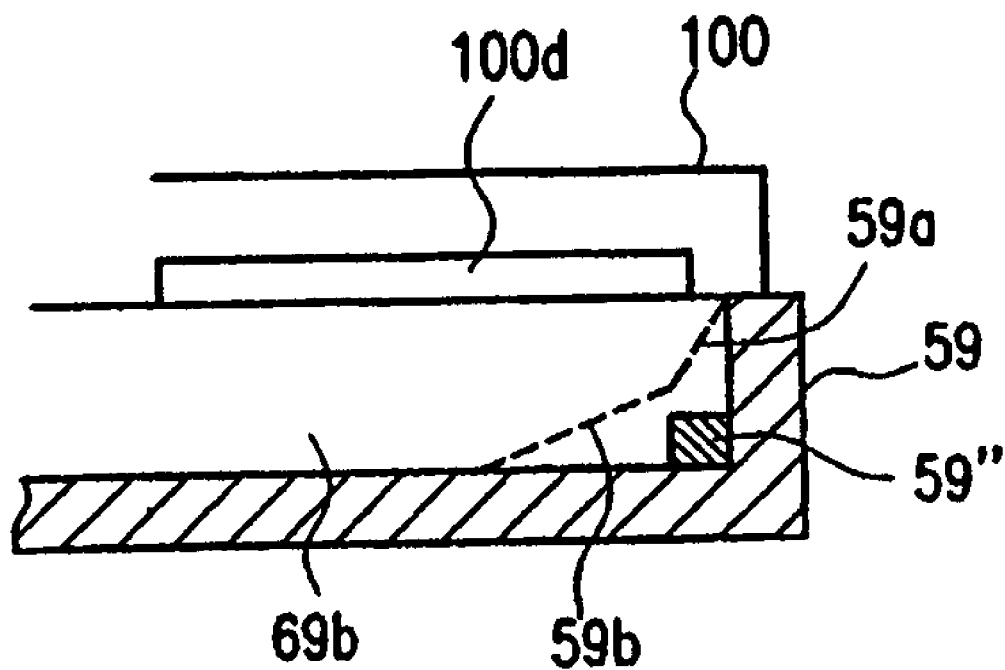
FIG. 10 is a cross-sectional view illustrating yet another exemplary space to be provided under the disc.

In this case, the space 69b defined has minimum required dimensions to prevent the data storage area 100d of the disc 100 from getting scratched. Accordingly, a greater space may be provided under the data storage area 100d of the disc 100. That is to say, the space 69b may be provided beyond the side surfaces 59a and 59b as shown in FIGS. 9 and 10. In that case, however, to sufficiently increase the mechanical strength of the outside portion of the holding structure 59 to hold the outer edge of the disc 100 thereon, a reinforced portion 59' or 59" is preferably provided adjacent to the outside portion. The side surfaces 59a and 59b can be used effectively to determine the allowable shapes of those reinforced portions 59' and 59".

These results show that by designing the first and second shutters 16 and 15 such that the first, second, third and fourth convex portions 16s, 15s, 11s and 16m and the concave portion 16b made up of these convex portions define the space 69b under the disc 100 as shown in FIG. 7, the data storage area of the disc 100 in the disc cartridge 101 can be protected even under some pressure applied by the user.

In the preferred embodiment described above, a plurality of disc holding members 12a are provided so as to protrude toward the disc window 12w and form integral parts of the cartridge body 10. However, the disc holding members may have any other shape and may be provided at any other positions as long as the disc holding members can prevent the disc from dropping through the disc window 12w and can hold the disc thereon while the shutters are closed. Even so, the disc holding members also preferably hold or release the disc as the shutters are going to open or close. For example, a disc cartridge according to another preferred embodiment of the present invention may include a ringlike disc holding portion that protrudes toward the disc window 12w and interlocks with the first or second shutter so as to move up and down in the disc storage portion 10d.

Embodiment 2

Figure 11:
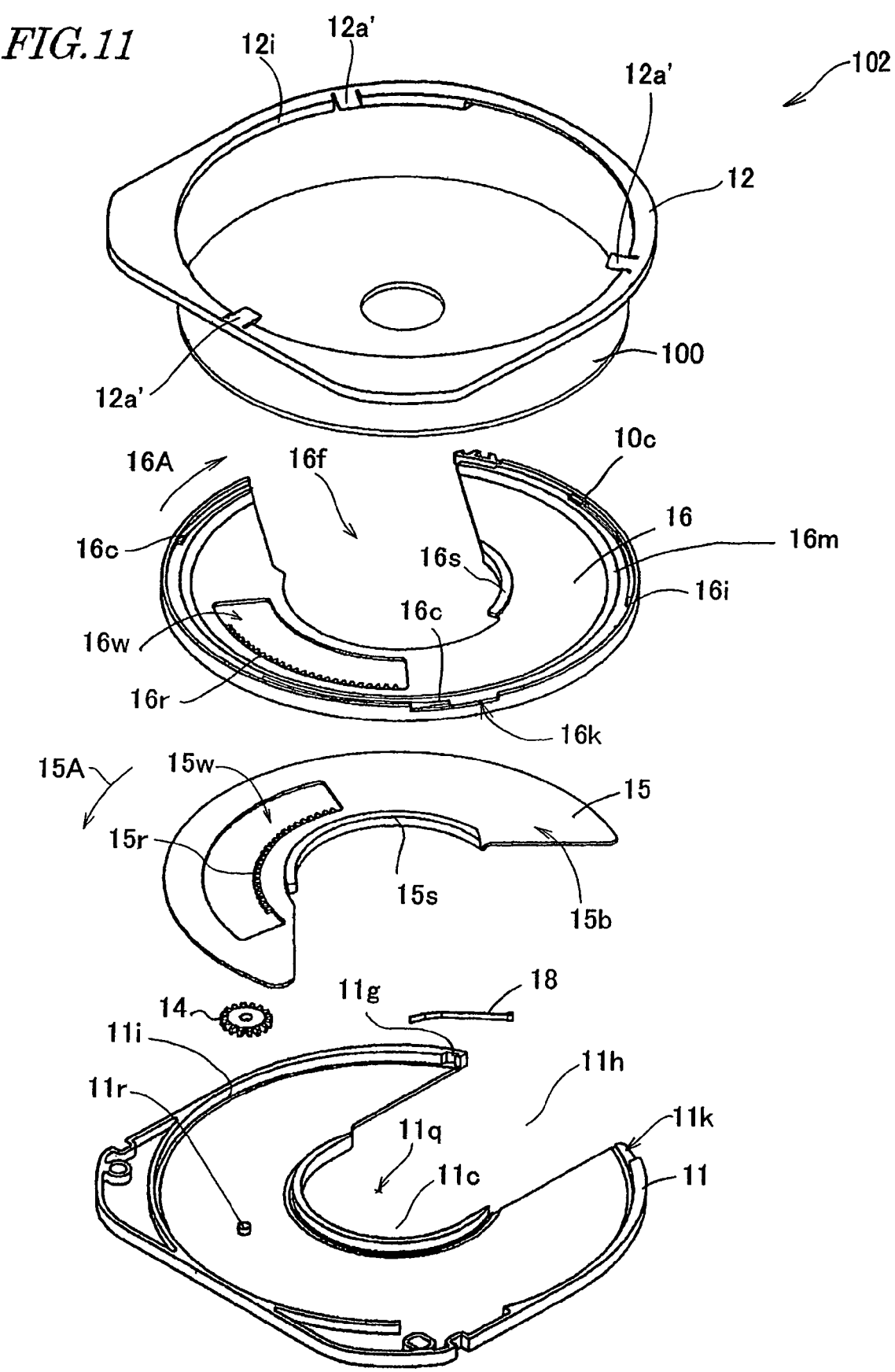
FIG. 11 is an exploded perspective view illustrating a disc cartridge according to a second specific preferred embodiment of the present invention.
Figure 12A:
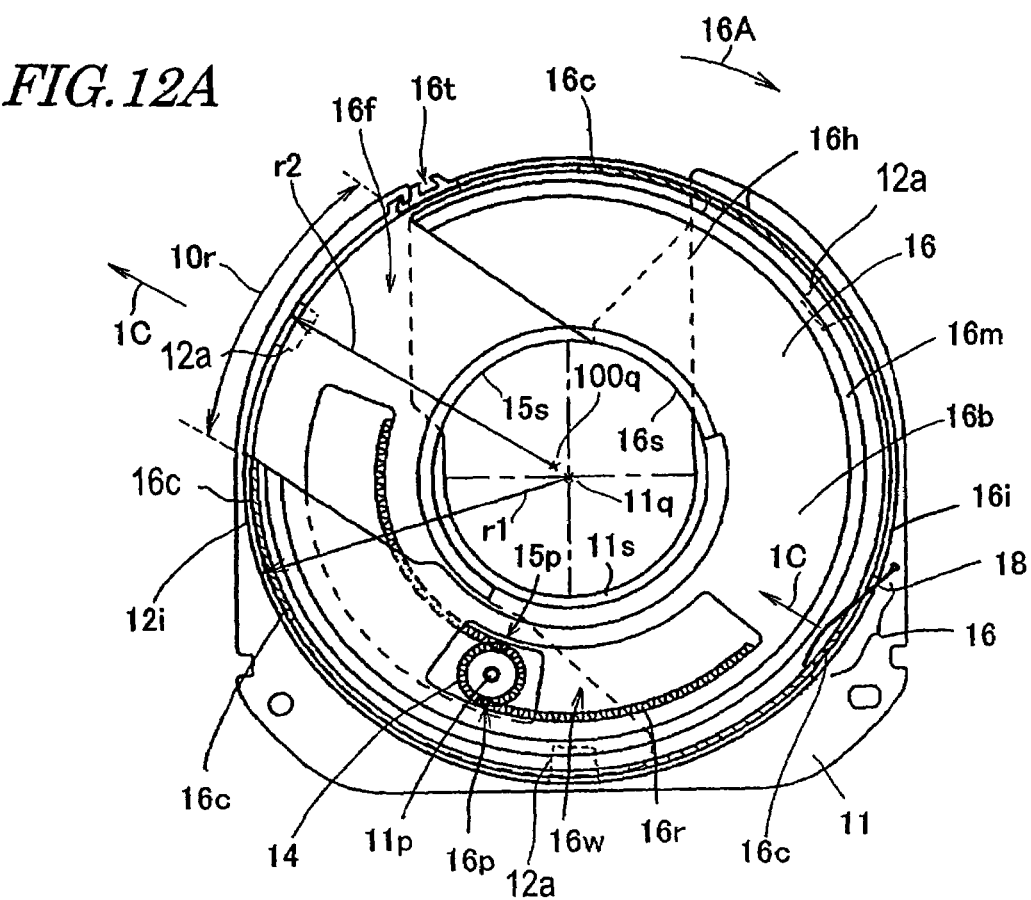
FIGS. 12A and 12B are plan views illustrating the internal structure of the disc cartridge shown in FIG. 11 with the cartridge upper shell removed and showing a state where its shutters are closed and a state where its shutters are opened, respectively.
Figure 12B:
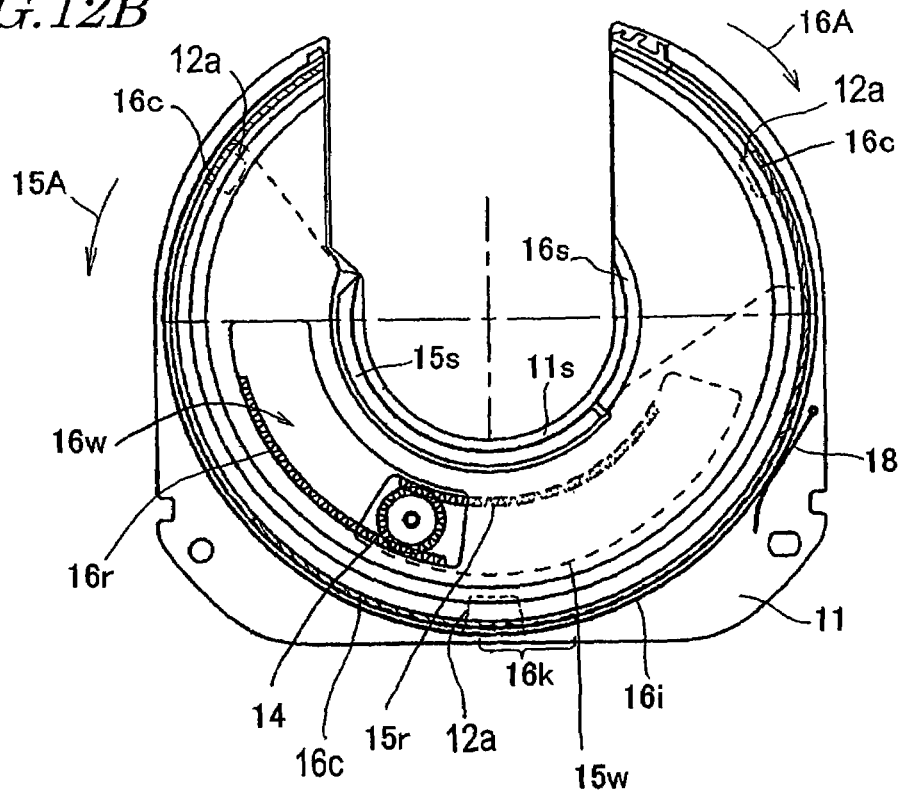

Hereinafter, a disc cartridge according to a second specific preferred embodiment of the present invention will be described. FIG. 11 is an exploded perspective view illustrating a disc cartridge 102 according to this second preferred embodiment. FIGS. 12A and 12B are plan views illustrating the internal structure of the disc cartridge 102 with the cartridge upper shell 12 removed and showing a state where the first and second shutters 16 and 15 are closed and a state where these shutters 16 and 15 are opened, respectively. In FIGS. 11, 12A and 12B, any component of the disc cartridge 102, having the same function as the counterpart of the disc cartridge 101 of the first preferred embodiment described above, is identified by the same reference numeral as that used in FIG. 3.

In the disc cartridge 101 of the first preferred embodiment described above, the disc holding members 12a preferably grip the disc 100 thereon so as to match the center of the disc 100 to that of the disc storage portion 10d. In this preferred embodiment, however, the disc 100 is preferably held so as to be offset from the center of the disc storage portion 10d. For that purpose, the disc cartridge 102 preferably includes a disc holding member 18 and the standup wall 16i of the first shutter 16 is preferably provided with a notch 16k.

As shown in FIG. 12A, the disc holding member 18 is preferably a leaf spring made of a metal, a resin or any other suitable material, and one end thereof is preferably secured to the cartridge lower shell 11. While the shutters are closed, the disc holding member 18 preferably enters the disc storage portion 10d through the notch 16k of the first shutter 16 so as to apply elastic force to the disc 100, stored in the disc storage portion 10d, in the direction indicated by the arrow 1C. As shown in FIG. 12A, the radius of curvature r1 of the sidewall 12i of the disc storage portion 10d is preferably equal to that of the circular disc storage portion 10d of which the center is defined by the point 11q. On the other hand, an area 10r where the notch 16f of the first shutter 16 is located preferably has a radius of curvature r2 that is equal to that of the outer edge of the disc 100. The center of this area 10r is preferably defined by a point 100q.

Figure 13:
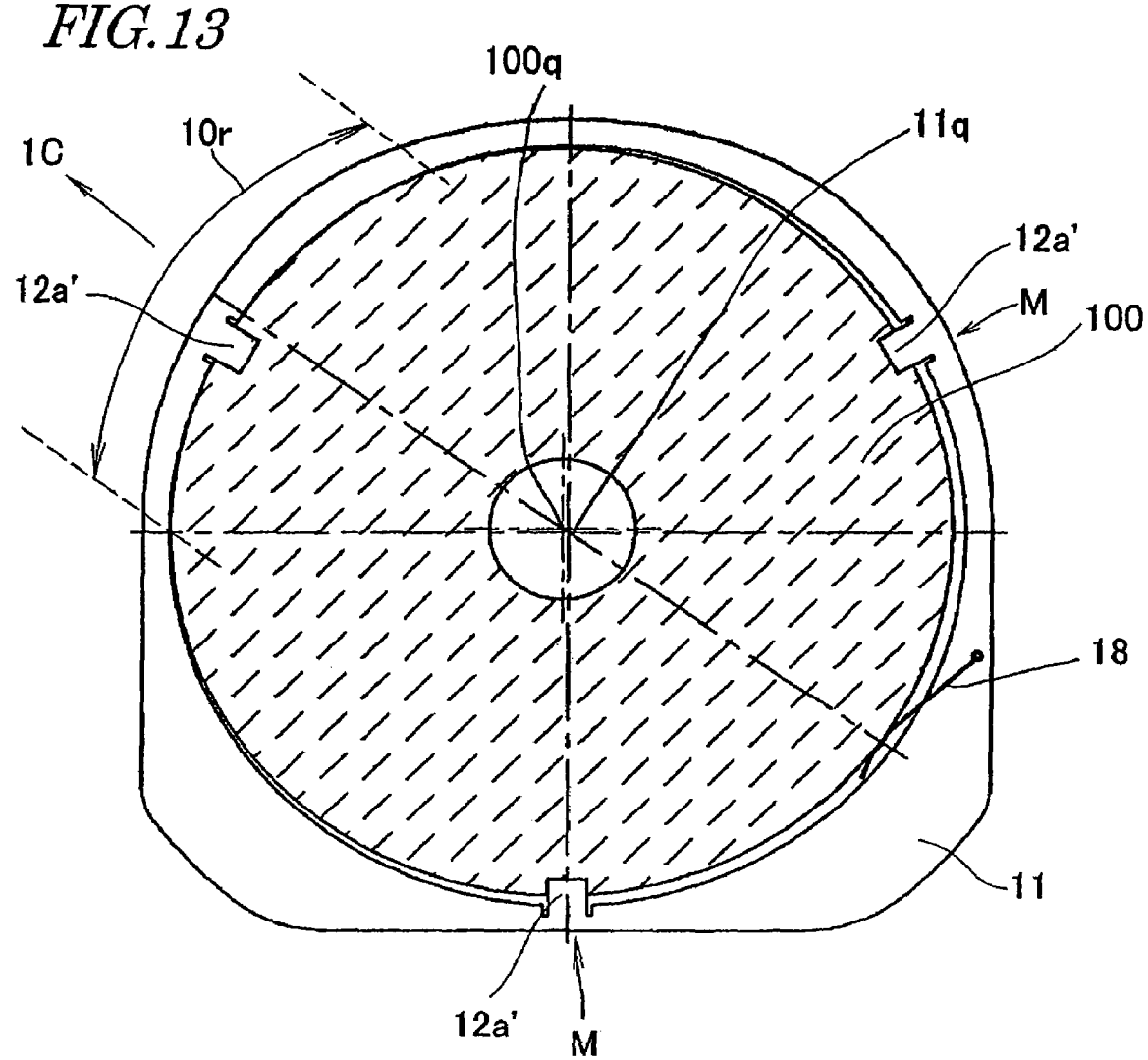
FIG. 13 is a plan view illustrating how the disc cartridge shown in FIG. 11 holds a disc.

As shown in FIG. 13, elastic force is preferably applied from the disc holding member 18 to the disc 100 within the disc storage portion 10d in the direction indicated by the arrow 1C, and the disc 100 is preferably held with its center offset from that of the disc storage portion 10d in the direction 1C such that the outer edge of the disc 100 contacts with the sidewall 12i of the disc storage portion 10d in the area 10r. In this case, the disc holding member 18 preferably presses the disc 100 only in the direction 1C and cannot press the disc 100 against the first shutter 16. Instead, the disc 100 is preferably pressed against the first shutter 16 by other disc holding members 12a' as will be described below.

In opening the shutters, the shutters are preferably rotated by moving the opener/closer 16t in the direction indicated by the arrow 16A as shown in FIG. 12B. As the first shutter 16 rotates in the direction 16A, the notch 16k of the standup wall 16i also moves in the same direction. Then, the standup wall 16i soon makes contact with the disc holding member 18, thereby pressing the disc holding member 18 in the direction opposite to the direction 1C. As a result, the disc holding member 18 separates from the disc 100 and stops applying elastic force to the disc 100 within the disc storage portion 10d in the direction 1C.

And when the shutters are closed in this manner, the disc holding member 18 preferably holds and offsets the disc 100 with respect to the center of the disc storage portion 10d such that the outer edge of the disc 100 contacts with the sidewall 12i in the area where the notch 16f of the first shutter 16 is located. That is to say, while the shutters are closed, the disc holding member 18 preferably functions so as to hold and fix the disc 100 at a predetermined position on a plane that is defined parallel to the disc 100.

Figure 14A:
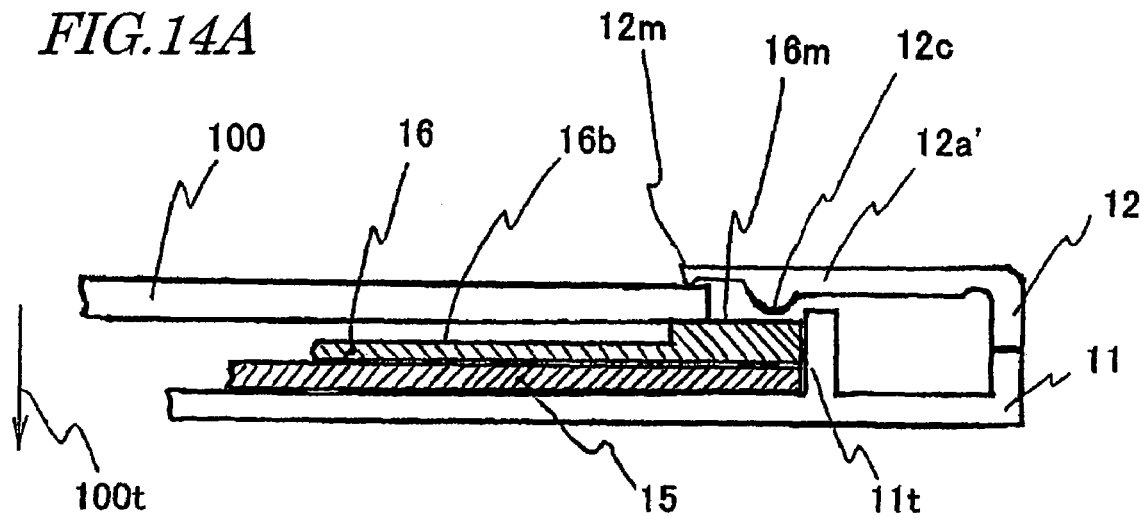
FIGS. 14A and 14B are cross-sectional views of a disc holding member as taken in a disc radial direction when the shutters are closed and when the shutters are opened, respectively.

Hereinafter, it will be described with reference to FIGS. 14A and 14B how the disc holding members 12a' hold the disc 100. FIG. 14A is a cross-sectional view of one of the disc holding members 12a' as taken in the disc radial direction when the first and second shutters 16 and 15 cover the head access window 11h and hold the disc 100 thereon. On the other hand, FIG. 14B is a cross-sectional view of the disc holding member 12a' as taken in the disc radial direction when the first and second shutters 16 and 15 have exposed the chucking hole 11c and the head access window 11h and released the disc 100 to allow it to rotate in the disc cartridge 102.

Each disc holding member 12a' preferably includes a contact portion 12m in the vicinity of its end and on the surface opposed to the disc 100. The contact portion 12m preferably sticks out over the projection area of the disc and the outer edge of the disc 100. The disc holding member 12a' preferably brings the contact portion 12m into contact with the outer edge of the label side of the disc 100, thereby pressing the disc 100 in the thickness direction as indicated by the arrow 100t and bringing the data storage side 100A (i.e., the second side) of the disc 100 into plane contact with the first, second, third and fourth convex portions 16s, 15s, 11s and 16m as shown in FIG. 14A. In this manner, the disc holding member 12a' holds and fixes the disc 100 at a predetermined position in the thickness direction. In this preferred embodiment, the contact portion 12m preferably has a rounded raised shape so as to make a point or line contact with the disc 100. Alternatively, the contact portion 12m may also be designed so as to make a plane contact with the disc 100.

Figure 14B:
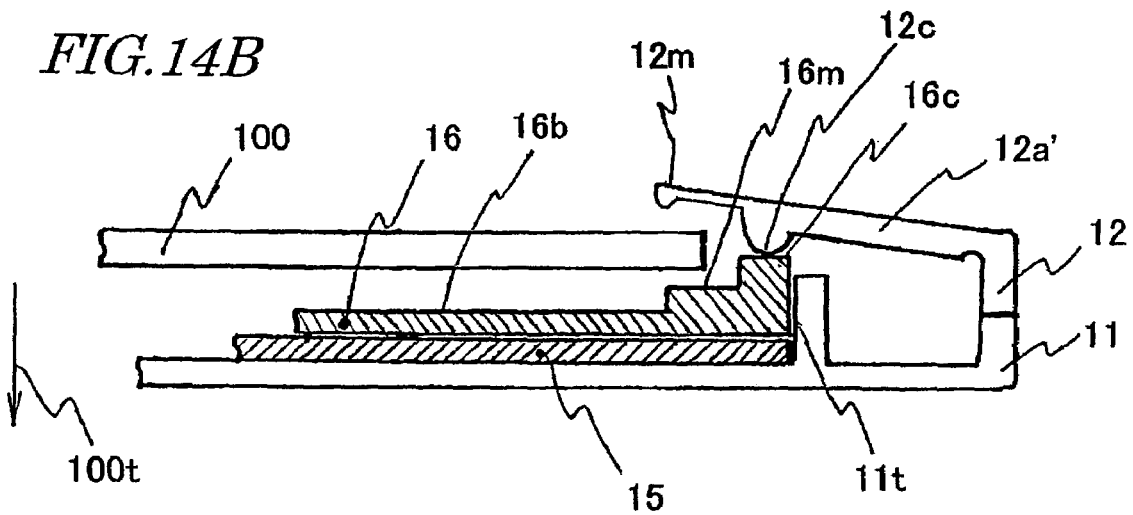

As shown in FIG. 14B, when the two closed shutters start to rotate and open, a guide rib 16c provided for the first shutter 16, preferably makes contact with convex portions 12c on the respective inside surfaces of the disc holding members 12a', thereby lifting the disc holding members 12a'. As a result, the disc 100 is released from the grip of the contact portions 12m. At this point in time, the disc holding members 12a' still overhang a portion of the projection area of the disc (i.e., the outer edge thereof). Accordingly, even if the disc 100 is released, the disc 100 will not drop down from the disc cartridge 101 as already described for the first preferred embodiment.

As described above, in this preferred embodiment, while the shutters are closed, the disc holding member 18 fixes the disc 100 in the direction parallel to the two principal surfaces of the disc 100 and the disc holding members 12a' fix the disc 100 in the thickness direction thereof. Thus, the disc 100 can be held and fixed at a predetermined position within the disc storage portion.

In this case, as shown in FIG. 12A, a ringlike series of convex portions, consisting of the first, second and third convex portions 16s, 15s and 11s, preferably contacts with the data storage side of the disc 100 inside of the data storage area thereof, while the fourth convex portion 16m preferably contacts with the data storage side of the disc 100 outside of the data storage area. In addition, in the area where the notch 16f is located, the outer edge of the disc 100 preferably contacts with the sidewall 12i of the disc storage portion 10d. Through these contacts, the space to which the data storage area of the disc is exposed can be closed completely airtight, thus preventing dust from entering this space and depositing on the data storage area.

In the preferred embodiment described above, to hold and fix the disc 100 while slightly offsetting it from the center of the disc storage portion 10d, the disc holding member 18 preferably fixes the disc 100 horizontally and the disc holding members 12a' preferably fix the disc 100 vertically. Alternatively, the disc 100 may also be held, fixed and offset from the center of the disc storage portion 10d using the disc holding members 12a with the slope 12b as described for the first preferred embodiment. For instance, in the example illustrated in FIG. 13, two of the three disc holding members 12a' of the disc cartridge 102 may be replaced with the disc holding members 12a with the slope 12b as indicated by the arrows M. Also, the two disc holding members 12a are preferably arranged such that their slopes 12b contact with the disc 100 at the same time while the shutters are going to be closed. Furthermore, the slopes 12b are preferably angled so as to produce a resultant of forces that presses the disc 100 in the direction 1C when contacting with the disc 100. Then, while the shutters are closed, the two disc holding members 12a indicated by the arrow M preferably bring the disc 100 into contact with the sidewall 12i of the disc storage portion 10d in the area 10r, thereby fixing the disc 100 horizontally. At the same time, the disc 100 can also be fixed vertically as well by the disc holding members 12a' and 12a.

Embodiment 3

Figure 15:
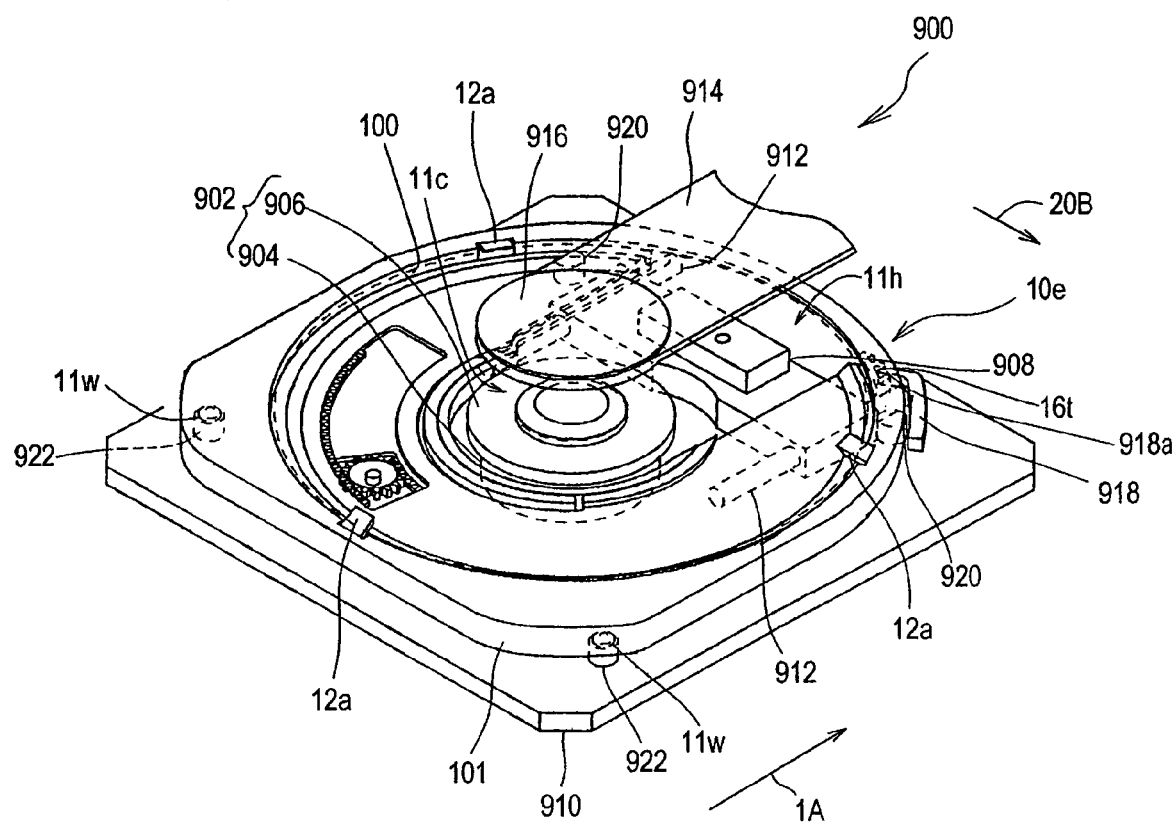
FIG. 15 is a perspective view illustrating an optical disc drive according to a preferred embodiment of the present invention.

Hereinafter, a disc drive according to a specific preferred embodiment of the present invention will be described. FIG. 15 is a perspective view schematically illustrating a main portion of a disc drive 900 according to this preferred embodiment. Either the disc cartridge 101 of the first preferred embodiment described above or the disc cartridge 102 of the second preferred embodiment described above may be loaded into this disc drive 900. In the specific example illustrated in FIG. 15, the disc cartridge 101 of the first preferred embodiment is loaded into this disc drive 900. In FIG. 15, the disc 100 is not illustrated but only its outline is indicated by the dashed line to make the internal structure of this disc drive fully viewable.

As shown in FIG. 15, the disc drive 900 preferably includes a drive mechanism 902 for rotating the disc 100 that is stored in the disc cartridge 101 and a head 908 for reading and/or writing data from/on the disc 100.

The drive mechanism 902 preferably includes a spindle motor 904 and a turntable 906 that is fitted with the shaft of the spindle motor 904. The spindle motor 904 is preferably supported on a base 910. The head 908 is preferably moved by an actuator (not shown) along a guide shaft 912.

The disc drive 900 preferably further includes a clamper 916 that is supported by an arm 914. Each of the turntable 906 and the clamper 916 preferably includes a magnet and a magnetic body, for example. As will be described later, the disc 100 is preferably sandwiched and held between the clamper 916 and the turntable 906 by utilizing the attraction between the magnets, and thereby mounted onto the turntable 906. In this manner, the driving force of the spindle motor 904 can be transmitted to the disc 100 just as intended and the disc 100 can be rotated without fluttering.

The disc drive 900 further includes a shutter opening/closing mechanism 918 that engages with the opener/closer 16t of the first shutter 16 to open and close the shutters 16 and 15. The shutter opening/closing mechanism 918 needs to be located beside the opener/closer 16t of the disc cartridge to be inserted into this disc drive 900. The shutter opening/closing mechanism 918 preferably includes an engaging portion 918a to engage with the opener/closer 16t.

Posts 920 are preferably provided on the base 910 to define the vertical level of the disc cartridge 101 with respect to the base 910. That is to say, the disc cartridge 101 is preferably supported on the top of the posts 920. Also, positioning pins 922 are preferably further provided on the base 910 so as to engage with the positioning holes 11w of the disc cartridge 101.

These posts 920 and positioning pins 922 preferably function as a supporting structure for setting the disc cartridge 101 at a predetermined position with respect to the drive mechanism 902. Optionally, instead of the posts 920 and positioning pins 922, a tray may be provided as an alternative supporting structure for the disc drive 900. In that case, the tray may be drawn out to mount the disc cartridge 101 thereon and then inserted into the disc drive 900 to load the disc 100 into the disc drive 900 and to put the disc cartridge 101 at a predetermined position with respect to the drive mechanism 902 and the head 908. As another alternative supporting structure, the tray and the positioning pins 922 may be used in combination.

Hereinafter, it will be described how this disc drive 900 operates.

First, the disc cartridge 101 that stores the disc 100 therein is preferably loaded into the disc drive 900. The disc cartridge 101 may be loaded either manually by the user or automatically by a loading mechanism (not shown). In the latter case, the loading mechanism may transport the disc cartridge 101 from a disc cartridge insert slot (not shown) of the disc drive 900 to the position illustrated in FIG. 15. Then, the concave portion 10c shown in FIG. 2 may be provided for the disc cartridge so as to be engaged with the loading mechanism. Alternatively, the tray may also be used as described above. In any of these methods, the disc cartridge 101 is preferably set at a predetermined position with respect to the drive mechanism 902 and head 908.

When the disc cartridge 101 is settled at the position shown in FIG. 15, the shutter opening/closing mechanism 918 preferably engages with the opener/closer 16t, thereby sliding the opener/closer 16t in the direction indicated by the arrow 20B. As a result, the first and second shutters 16 and 15 start to open and expose the head access window 11h and chucking hole 11c in the end. Also, as already described for the first preferred embodiment, the shutter opening/closing mechanism 918 preferably makes the disc holding members 12a release the disc 100 by way of the first shutter 16. Thus, the disc 100 is released from the disc holding members 12a. Subsequently, the arm 914 holding the clamper 916 thereon preferably lowers, thereby sandwiching and holding the disc 100 between the clamper 916 and the turntable 906. Consequently, the disc 100 is mounted on the turntable 906 so as to be rotatable in the disc storage portion of the disc cartridge 101.

Next, while the spindle motor 904 is rotating the disc 100, the head 908 preferably accesses the data storage area of the disc 100 to read or write data from/on the disc 100.

To unload the disc cartridge 101 from the disc drive 900, first, the arm 914 is preferably raised, thereby separating the clamper 916 from the disc 100. Next, the shutter opening/closing mechanism 918 is preferably moved in the direction opposite to that indicated by the arrow 20B to slide the opener/closer 16t. As a result, the first and second shutters 16 and 15 are closed. As the first and second shutters 16 and 15 are going to be closed, the disc holding members 12a preferably grip the disc 100 thereon. And when the first and second shutters 16 and 15 are completely closed, the disc holding members 12a preferably hold the disc 100 thereon. Thereafter, an unloading mechanism (not shown) preferably ejects the disc cartridge 101 from the disc drive 900.

Into the disc drive 900 shown in FIG. 15, the disc cartridge 101 is supposed to be loaded horizontally. Alternatively, the disc drive 900 may also be mounted vertically so that the disc cartridge is loaded thereto vertically. This is because even when the disc cartridge is loaded vertically into the disc drive 900, the disc holding members 12a, protruding into the disc window 12w, can still prevent the disc 100 from dropping down through the disc window 12w.

In the disc cartridge according to any of various preferred embodiments of the present invention described above, the projection area of the cartridge can be almost equal to that of the disc to be stored there. The two shutters preferably get engaged with the rotational member so as to rotate in mutually opposite directions, and one of the two shutters is preferably opened or closed at an increased velocity, thereby opening and closing the shutters smoothly with respect to a relatively big head access window even in a small cartridge. That is to say, the head access window of a small cartridge can be as big as that of a large cartridge, thus increasing the compatibility between the small and large cartridges. Also, the disc cartridge according to any of various preferred embodiments of the present invention can be used effectively to store a single-sided disc. The cartridge body thereof is designed so as to cover only the data storage side of the disc and expose the other side thereof, thus reducing the overall thickness of the cartridge.

Furthermore, by designing the shutters in such a shape as to cover just one side of the disc cartridge, the shutters can have a simplified structure and can be made at a reduced cost. Furthermore, the disc holding members hold the disc by pressing the disc against either the shutters or the cartridge body. Accordingly, the disc will not move inconstantly in the cartridge body and no dust will be deposited on the data storage side of the disc, either. Furthermore, the disc cartridge can also look great or beautiful by displaying the label side of the disc through the disc window.

Consequently, according to various preferred embodiments of the present invention described above, the disc cartridge can be designed so as to have a relatively big head access window for its small projection area of the cartridge, thus ensuring expanded cartridge compatibility. As a result, a thin, highly dustproof, and great looking disc cartridge is provided so as to be applicable for use in any of various types of disc drives including a disc camcorder.

INDUSTRIAL APPLICABILITY

A disc cartridge according to various preferred embodiments of the present invention described above can be used effectively to hold a disk storage medium that follows any of various recording formats. Also, the disc cartridge is so dustproof as to store a high-density storage medium safely. Furthermore, the disc cartridge can also be downsized easily. Thus, the disc cartridge can be used particularly effectively in a small-sized disc drive for a disc camcorder, for example.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The invention claimed is:

1. A disc cartridge comprising:
   a cartridge body including a disc storage portion, a chucking hole and a head access window, wherein the disc storage portion stores a disc therein so that the disc is rotatable in the disc storage portion; the chucking hole is formed on the bottom of the disc storage portion so as to get the disc chucked externally; and the head access window is also formed on the bottom of the disc storage portion so as to allow a head, which reads and/or writes data from/on the disc, to access the disc;
   a first shutter and a second shutter, provided in the disc storage portion, for exposing or covering the head access window by rotating in the disc storage portion; and
   a rotational member, which is provided so as to rotate in the disc storage portion and which is interlocked with the first and second shutters,
   wherein the first and second shutters are interlocked with the rotational member so as to rotate in mutually opposite directions and at respectively different velocities.

2. A disc cartridge comprising:
   a cartridge body including a disc storage portion, a chucking hole and a head access window, wherein the disc storage portion has a disc window and a bottom and stores a disc, having first and second sides, therein so that the disc is rotatable in the disc storage portion and that the first side of the disc is exposed through the disc window; the chucking hole is formed on the bottom of the disc storage portion so as to get the disc chucked externally; and the head access window is also formed on the bottom of the disc storage portion so as to allow a head, which reads and/or writes data from/on the second side of the disc, to access the second side of the disc;
   a first shutter and a second shutter, provided in the disc storage portion, for exposing or covering the head access window by rotating in the disc storage portion;
   a rotational member, which is provided on the bottom of the disc storage portion so as to rotate therein and which is interlocked with the first and second shutters; and
   a disc holding portion for holding the disc such that the disc is fixed on the cartridge body while the first and second shutters are closed,
   wherein the first and second shutters are interlocked with the rotational member so as to rotate in mutually opposite directions and at respectively different velocities.

3. The disc cartridge of claim 2, wherein the disc holding portion is interlocked with the first or second shutter so as to hold the disc thereon as the first or second shutter is going to close.

4. The disc cartridge of claim 1, wherein the disc holding portion releases the disc as the first or second shutter is going to open.

5. The disc cartridge of claim 2, wherein the first shutter includes an arced first convex portion around the chucking hole, the second shutter includes an arced second convex portion around the chucking hole, the disc storage portion includes an arced third convex portion around the chucking hole, and the first or second shutter further includes a fourth convex portion along its outer edge, and
   werein the disc holding portion holds the disc thereon by bringing the second side of the disc into contact with the first, second, third and fourth convex portions.

6. The disc cartridge of claim 5, wherein while the first and second shutters are closed, the disc is fixed in the cartridge body such that a data storage area on the second side of the disc is located between the first, second and third convex portions and the fourth convex portion.

7. The disc cartridge of claim 6, wherein at least one of the first and second shutters includes a notch that aligns with the head access window while the first and second shutters are closed, and wherein the disc storage portion includes a sidewall along an outer periphery of the bottom, and wherein the disc holding portion holds the disc thereon and fixes the disc with respect to the disc storage portion with the center of the disc offset from the center of the disc storage portion such that an outer side surface of the disc contacts with the sidewall of the disc storage portion at a position where the notch is located while the first and second shutters are closed.

8. The disc cartridge of claim 7, wherein the disc holding portion includes a first disc holding member and a second disc holding member, and wherein while the first and second shutters are closed, the first disc holding member applies outward force to the disc such that the outer side surface of the disc contacts with the sidewall of the disc storage portion, and the second disc holding member applies force to the disc toward the bottom of the disc storage portion.

9. The disc cartridge of claim 7, wherein the first shutter includes a sidewall around its outer edge, the sidewall of the first shutter being provided with the notch, and wherein while the first and second shutters are closed, the first disc holding member applies force to the disc through the notch.

10. The disc cartridge of claim 9, wherein as the first and second shutters are going to open, rotation of the first shutter brings the first disc holding member into contact with the sidewall of the first shutter, thereby stopping applying the force to the disc.

11. The disc cartridge of claim 10, wherein the first shutter includes a guide rib near the inside surface of the sidewall, and wherein the second disc holding member is provided for the cartridge body via an elastic member so as to protrude toward the disc window, and wherein while the first and second shutters are going to open, the second disc holding member contacts with, and is raised by, the guide rib, thereby releasing the disc.

12. The disc cartridge of claim 2, wherein the disc holding portion includes a plurality of disc holding members, each having a downwardly tapered slope and being arranged along the circumference of the disc, and grips the disc thereon and fixes the disc to the cartridge body by bringing the slopes into contact with the outer side surface of the disc.

13. The disc cartridge of claim 12, wherein the disc holding portion is provided for the cartridge body so as to protrude toward the disc window.

14. The disc cartridge of claim 13, wherein the first shutter includes a sidewall around its outer edge and a guide rib near the inside surface of the sidewall, and wherein while the first and second shutters are going to open, the disc holding portion contacts with, and is raised by, the guide rib, thereby releasing the disc.

15. The disc cartridge of claim 2, wherein the disc holding portion forms an integral part of the cartridge body.

16. The disc cartridge of claim 1, wherein the first and second shutters are provided in the disc storage portion so as to overlap with each other at least partially.

17. The disc cartridge of claim 1, wherein the rotational member is a gear, and wherein the first and second shutters include a first rack and a second rack, respectively, the first and second racks being arced so as to have their centers matched to the center of rotation of the first and second shutters, having mutually different radii, and engaging with the rotational member.

18. The disc cartridge of claim 17, wherein the first and second shutters include a first opening and a second opening, respectively, to receive the rotational member.

19. The disc cartridge of claim 18, wherein the first rack of the first shutter defines a portion of the first opening, and the second rack of the second shutter defines a portion of the second opening.

20. The disc cartridge of claim 17, wherein the rotational member overlaps with the first and second shutters at least partially while the first and second shutters are open or closed.

21. The disc cartridge of claim 1, wherein the first and second shutters engage with the rotational member along a line that connects the center of rotation of the first and second shutters and that of the rotational member together.

22. The disc cartridge of claim 1, wherein the first and second shutters rotate at a rotational velocity ratio of about 1.2 to about 3.

23. The disc cartridge of claim 1, wherein ends of the first and second shutters overlap with each other in a projection area of the head access window, thereby covering the head access window.

24. The disc cartridge of claim 1, wherein the rotational member is a gear, of which the thickness is approximately equal to the sum of the thicknesses of the first and second shutters.

25. The disc cartridge of claim 2, wherein supposing that a distance from the center of the disc to a first point on the second side of the disc is Rin, where the first point is located closer to the center of the disc than, and defined near, the inner boundary of the disc storage area while the first and second shutters are closed;

a distance from the center of the disc to a second point on the second side of the disc is Rout, where the second point is located closer to an outer edge of the disc than, and defined near, the outer boundary of the disc storage area while the first and second shutters are closed;

a space having a height S needs to be provided under the second side of the disc;

a first circle having a radius of Rout is defined on the second side of the disc;

a second circle having a radius of (Rout-1.2 S) is defined on a plane that is separated from the second side by a distance of 0.3 S and parallel to the second side; and a third circle having a radius of (Rout-16.2 S) is defined on a plane that is separated from the second side by the distance S and parallel to the second side, the space is obtained by removing a circular cylinder, having a bottom radius of Rin as measured from the center of the disc and the height S from first and second truncated cones, where the bottom and top of the first truncated cone are defined by the first and second circles, respectively, and the bottom and top of the second truncated cone are defined by the second and third circles, respectively.

26. The disc cartridge of claim 25, wherein the S is 1 mm, the Rin is 20 mm, and the Rout is 39 mm or 59 mm.

27. A data storage medium comprising
the disc cartridge of claim 1, and
a disc, which is stored in the disc storage portion of the disc cartridge and on which data is ready to be written.

28. A disc drive, which is designed so as to be loaded with the disc cartridge of claim 1 and to read and/or write data from/on a disc that is stored in the disc cartridge.

29. A disc drive comprising:
drive means for rotating a disc;
a head for reading and/or writing data from/on the disc;
a supporting structure for supporting the disc cartridge of claim 2, which stores the disc therein, at a predetermined position with respect to the drive means; and
a shutter opening/closing mechanism for opening the shutters of the disc cartridge and getting the disc released from the disc holding portion so that the disc is rotatable in the disc storage portion of the disc cartridge.

30. The disc drive of claim 29, further comprising a clamper for mounting the disc onto the drive means.

31. The disc drive of claim 30, wherein the supporting structure includes a positioning pin for fixing the disc cartridge at the predetermined position.

* * * * *